United States Patent
Venkata et al.

(10) Patent No.: US 12,120,531 B2
(45) Date of Patent: Oct. 15, 2024

(54) METHODS, SYSTEMS, AND APPARATUSES FOR HANDLING DYNAMIC SPECTRUM SHARING WITH UPLINK SUBCARRIER SHIFT

(71) Applicant: APPLE INC., Cupertino, CA (US)

(72) Inventors: Naveen Kumar R Palle Venkata, San Diego, CA (US); Alexander Sayenko, Bavaria-Bayern (DE); Anatoliy S. Ioffe, Cupertino, CA (US); Fangli Xu, Beijing (CN); Haijing Hu, Cupertino, CA (US); Leilei Song, Cupertino, CA (US); Ralf Rossbach, Bavaria-Bayern (DE); Ruoheng Liu, San Diego, CA (US); Sarma V. Vangala, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 189 days.

(21) Appl. No.: 17/593,508

(22) PCT Filed: Oct. 22, 2020

(86) PCT No.: PCT/CN2020/122929
§ 371 (c)(1),
(2) Date: Sep. 20, 2021

(87) PCT Pub. No.: WO2022/082642
PCT Pub. Date: Apr. 28, 2022

(65) Prior Publication Data
US 2022/0312221 A1 Sep. 29, 2022

(51) Int. Cl.
*H04W 16/14* (2009.01)
*H04W 8/22* (2009.01)
(Continued)

(52) U.S. Cl.
CPC ............ *H04W 16/14* (2013.01); *H04W 8/22* (2013.01); *H04W 36/14* (2013.01); *H04W 88/06* (2013.01)

(58) Field of Classification Search
CPC ....... H04W 16/14; H04W 8/22; H04W 36/14; H04W 88/06
See application file for complete search history.

(56) References Cited

U.S. PATENT DOCUMENTS

2020/0313838 A1* 10/2020 Jin ................. H04W 48/12
2021/0168699 A1* 6/2021 Luo ................ H04W 48/12
(Continued)

FOREIGN PATENT DOCUMENTS

| CN | 110140384 A | 8/2019 |
|---|---|---|
| CN | 110199497 A | 9/2019 |

(Continued)

OTHER PUBLICATIONS

PCT/CN2020/122929, International Search Report and Written Opinion, Jul. 15, 2021, 9 pages.
(Continued)

*Primary Examiner* — Dai Phuong
(74) *Attorney, Agent, or Firm* — Dorsey & Whitney LLP

(57) ABSTRACT

Embodiments described herein include methods, systems, and apparatuses for allowing a user equipment (UE) that supports dynamic spectrum sharing (DSS) with uplink (UL)-shift to access a cell and barring UEs that do not support DSS with UL-shift. Embodiments may use a cell barring field in a master information block and additional filters to indicate a barring state for a network node.

14 Claims, 11 Drawing Sheets

(51) Int. Cl.
*H04W 36/14* (2009.01)
*H04W 88/06* (2009.01)

(56) References Cited

U.S. PATENT DOCUMENTS

| | | | |
|---|---|---|---|
| 2022/0190978 | A1 | 6/2022 | Zhang et al. |
| 2023/0362612 | A1* | 11/2023 | Park .................. H04W 48/16 |
| 2024/0187971 | A1* | 6/2024 | Babaei ................ H04W 48/02 |

FOREIGN PATENT DOCUMENTS

| | | |
|---|---|---|
| CN | 111757363 A | 10/2020 |
| KR | 20200114926 A | 10/2020 |
| WO | 2018128426 A1 | 7/2018 |
| WO | 2020022762 A1 | 1/2020 |

OTHER PUBLICATIONS

CMCC, "Discussion on LTE/NR spectrum sharing in Band41/n41", R4-1905191, 3GPP TSG-RAN WG4 Meeting #90bis, Xian, China, Agenda Item 9.19.1, Apr. 8-12, 2019, 3 pages.
Apple Inc., "Email discussion summary for [95e][134] NR_n48_LTE_48_coex", R4-2008324, 3GPP TSG-RAN WG4 Meeting # 95-e Electronic meeting, Agenda Item 8.18, May 25-Jun. 5, 2020, 16 pages.
CMCC, "Further consideration on L TE/NR spectrum sharing in Band41 /n41", R4-1906066, 3GPP TSG-RAN WG4 Meeting #91 Reno, Nevada, US, Agenda Item 9.19.1, May 13-17, 2019, 4 pages.
Samsung, "Discussion on spectrum sharing among band 41/n41", R4-1905463, 3GPP TSG-RAN WG4 Meeting #91 Reno, Nevada, US, Agenda Item 9.19.1, May 13-17, 2019, 4 pages.

* cited by examiner

METHODS, SYSTEMS, AND APPARATUSES FOR HANDLING DYNAMIC SPECTRUM SHARING WITH UPLINK SUBCARRIER SHIFT

TECHNICAL FIELD

This application relates generally to wireless communication systems, including preventing interference caused by downlink spectrum sharing with uplink shift.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node R, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will, recognize these frequency ranges, which are provided by way of example, may change from time to time or from region to region.

BRIEF DESCRIPTION OF THE SEVERAL VIEWS OF THE DRAWINGS

To easily identify the discussion of any particular element or act the most significant digit or digits in a reference number refer to the figure number in which that element is first introduced.

DETAILED DESCRIPTION

Network communications have begun deploying 5G new radio (NR) to increase performance. One limitation to updating a network with NR is that some of the frequency spectrum may be currently used by Long Term Evolution (LTE). Simply using a new frequency spectrum may be costly for tire operator.

Thus, operators are desirous to integrate NR communication and LTE communication on the same spectrum. One method of integrating the NR communication and LTE communication is downlink spectrum sharing (DSS). However, the NR communication and the LTE communication may interfere with one another. For example, the uplink communications in NR and LTE may interfere. Accordingly. NR user equipment CUE) may be configured with an uplink shift to prevent such interference.

However, there are currently NR UEs in service that are not configured to provide the uplink shift. Accordingly, if these current NR UEs are allowed to operate on the same spectrum as the LTE UEs there will be interference. In contrast the NR UEs with DSS and uplink shift are capable of sharing the same spectrum as the LTE UEs. There is therefore an issue that some but not all NR UEs should be allowed to operate at the same time on the same spectrum as LTE UEs.

Embodiments herein address systems, methods, and apparatuses for preventing interference from NR UEs not configured with an uplink shift (non-configured UEs) while allowing access to those NR UEs with such capabilities (configured UEs). In some embodiments, available information elements are used to prevent the nonconfigured NR UEs and allow the configured UEs to access a cell.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
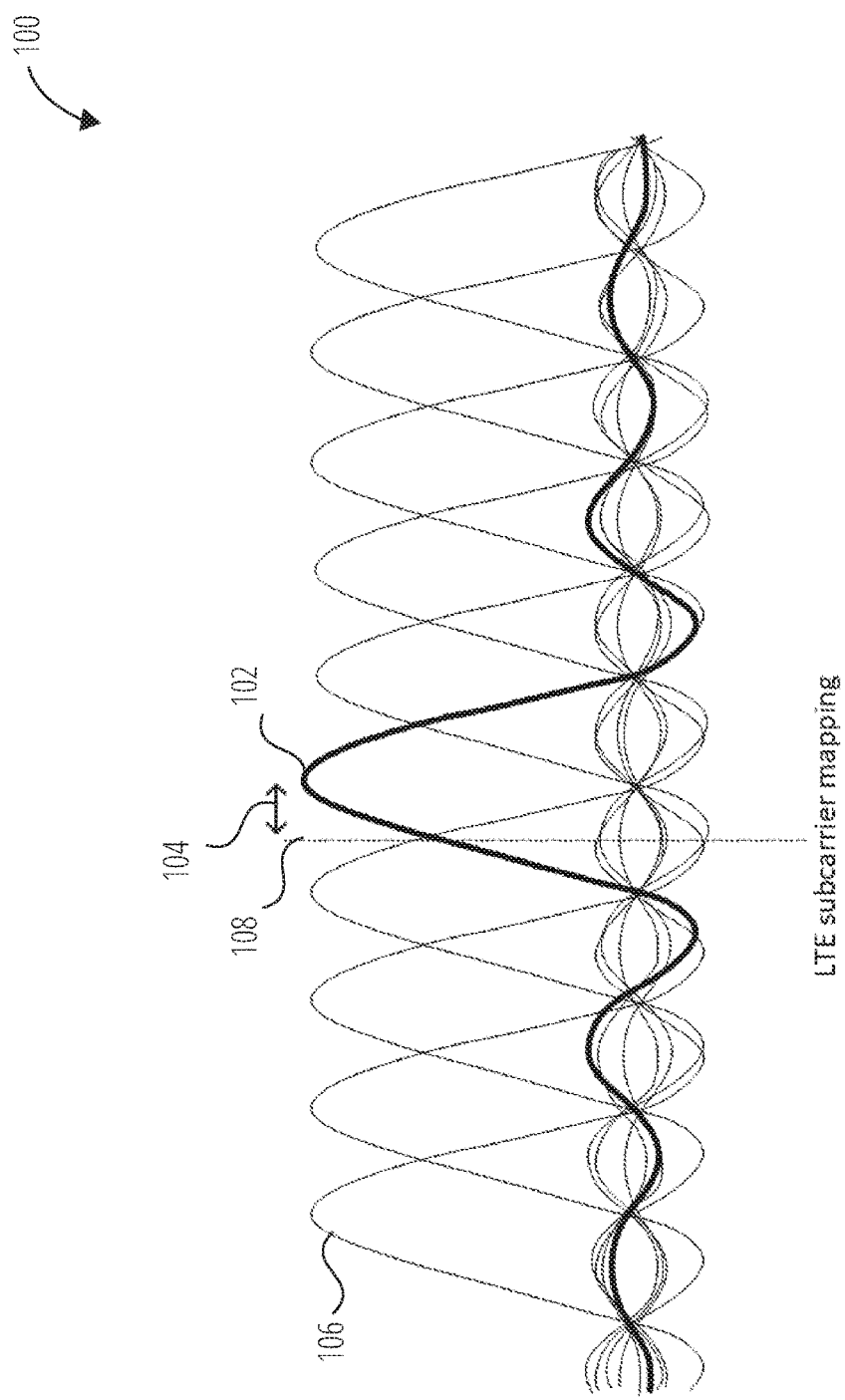
FIG. 1 illustrates a frequency-domain plot of an LTE signal subcarrier mapping in accordance with one embodiment.

FIG. 1 illustrates a frequency-domain plot 100 of an LTE signal subcarrier mapping. As shown, the LTE signal uses Orthogonal Frequency Division Multiplexing (OFDM) to divide the signal into smaller sub-carriers (e.g., sub-carrier 106 and center sub-carrier 102).

In LTE the carrier frequency and the center of the carrier (center sub-carrier 102) is fixed based on the operating bandwidth of the carrier. Both the UE and the network know the location of the carrier frequency and the center of the carrier. Placing a subcarrier at the zero-frequency location 108 would introduce complications at the network. In LTE to avoid modulating the zero-offset (DC) carrier, the sub-carriers are offset by half-sub carrier spacing 104 around the DC carrier, before the application of single carrier (SC)-OFDM. In the illustrated embodiment, the sub-carriers are 15 kHz and the sub-carriers are offset by 7.5 kHz. In LTE the UE is required to perform this uplink shift.

Figure 2:
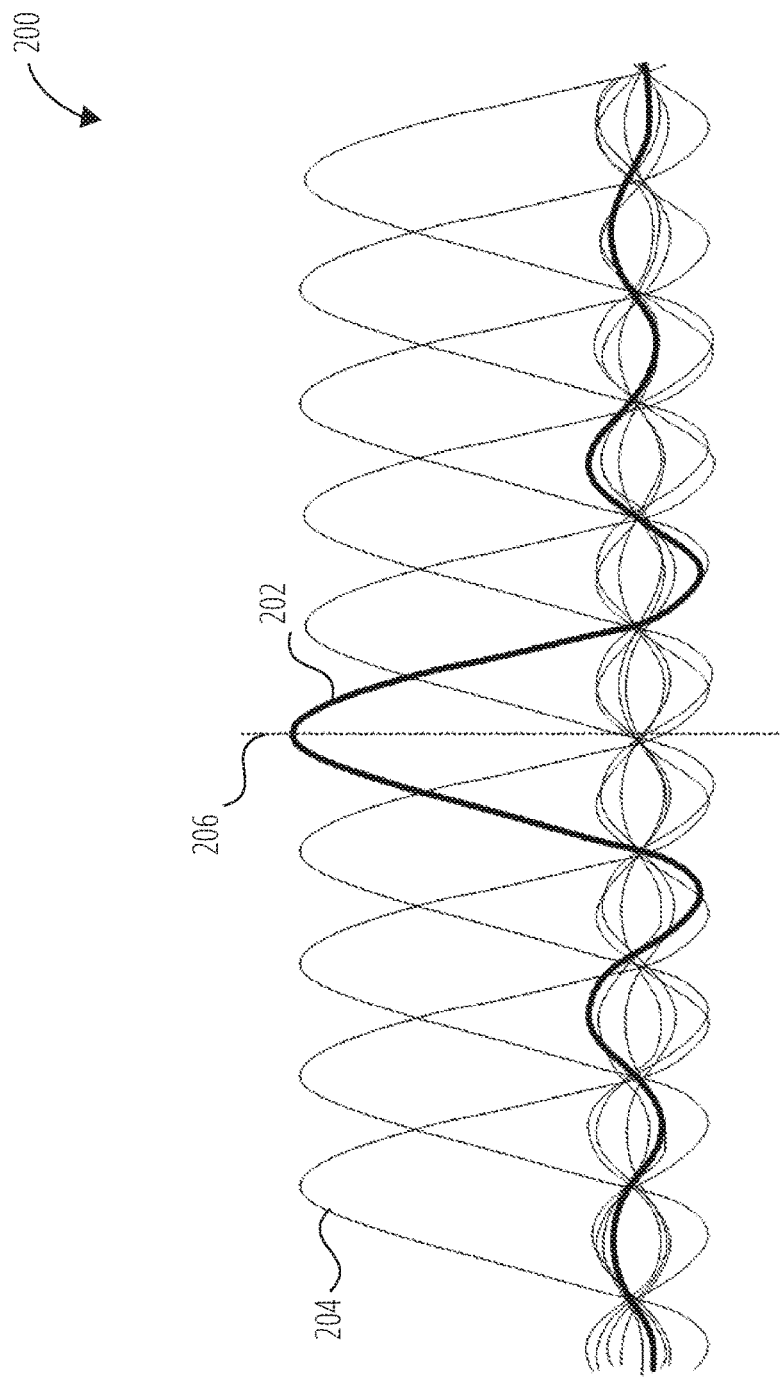
FIG. 2 illustrates a frequency-domain plot of a new radio (NR) signal subcarrier mapping without uplink shift in accordance with one embodiment.

FIG. 2 illustrates a frequency-domain plot 200 of a NR signal subcarrier mapping without uplink shift. As shown, the NR signal uses OFDM to divide the signal into smaller sub-carriers (e.g., sub-carrier 204 and center sub-carrier 202).

Unlike the LTE, in NR the UE may operate on a plurality of band width parts (BWP). In NR, the 7.5 kHz uplink offset has not typically been implemented. This is because the usage of the plurality of BWPs would mean different UEs operating in different BWPs would have different DC sub-carrier and from network perspective. Thus, the network may not detect and skip the DC sub carrier from each of the UE uplink transmissions. As the location of the subcarriers will constantly change DC location, in NR the UL shift requirement of LTE was removed. Accordingly, no NR docs not traditional feature an uplink shift and the center sub-carrier 202 may remain at the zero frequency location 208.

Figure 3:
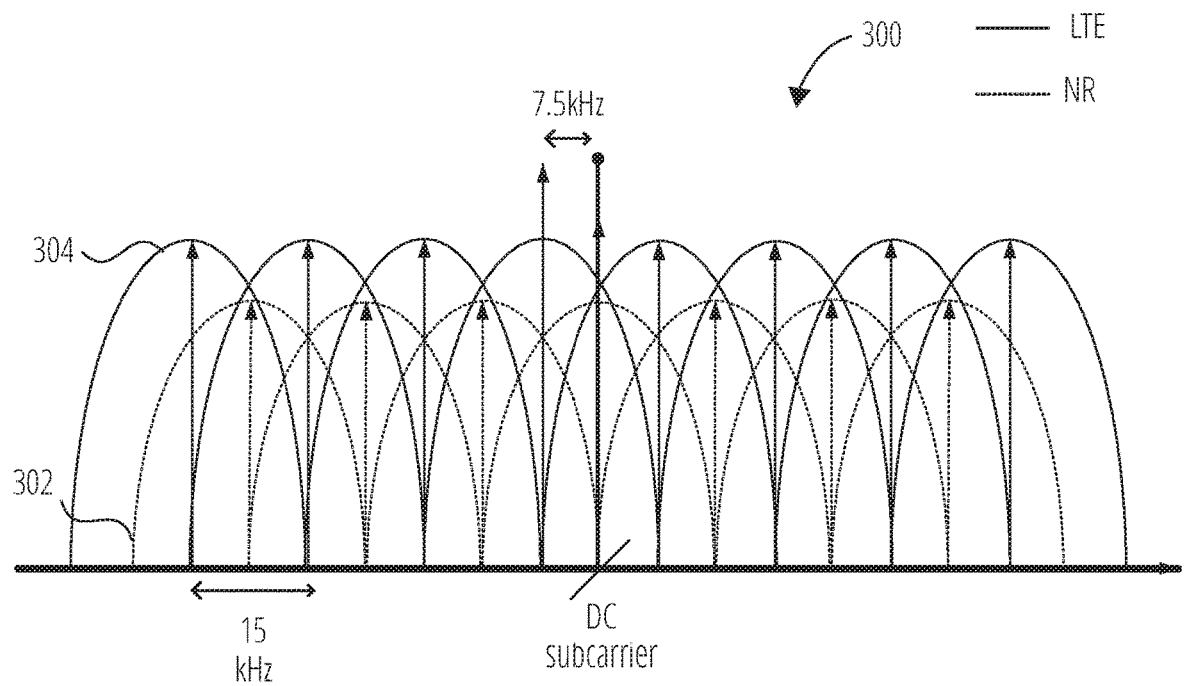
FIG. 3 illustrates a downlink signal plot of NR signal and an LTE signal using downlink spectrum sharing (DSS) in accordance with one embodiment.

FIG. 3 illustrates a downlink signal plot 300 of NR signal 302 and an LTE signal 304 using downlink spectrum sharing (DSS). Network communications operators may already have a frequency spectrum that they use for LTE UEs Adding new frequency spectrums is very costly. Thus, some operators may want to roll out NR on the same spectrum currently supporting LTE.

Simply switching from LTE to NR in the desired spectrum could cause connectivity issues for the LTE UEs already in operation. Thus, it is desirous to support both LTE and NR at the same time. One method to reuse the LTE spectrum for NR is to use DSS. DSS allows the NR signal 302 to overlay the LTE signal 304. If the network handles the downlink traffic carefully, the LTE UE may be serviced without knowing that the network is also serving NR. Similarly, NR UEs may not be aware that LTE UEs are being served.

Thus, DSS may be added in NR to allow the operators to re-use the existing LTE spectrum to deploy NR and still share the existing LTE spectrum with LTE UEs. Both LTE UEs and NR UEs may operate in the carrier where the LTE UEs communicate with the LTE base station and NR UEs communicate with the NR base station using the same spectrum. Sharing the same spectrum is possible when both LTE and NR use the same subcarrier spacing (e.g., 15 kHz) and the sub-carriers are orthogonal (time and frequency aligned). It may also be possible to operate NR in 30 kHz sub-carrier spacing, if sufficient guard period is present in frequency domain between the LTE and NR sub-carriers.

As shown, the downlink may be shared without fear of interference because the LTE signal 304 and the NR signal 302 are orthogonal to each other. The orthogonal nature of the two signals results in minimal cross carrier interference. However, a problem is presented when considering the uplink shift on LTE as described with reference to FIG. 3.

Figure 4:
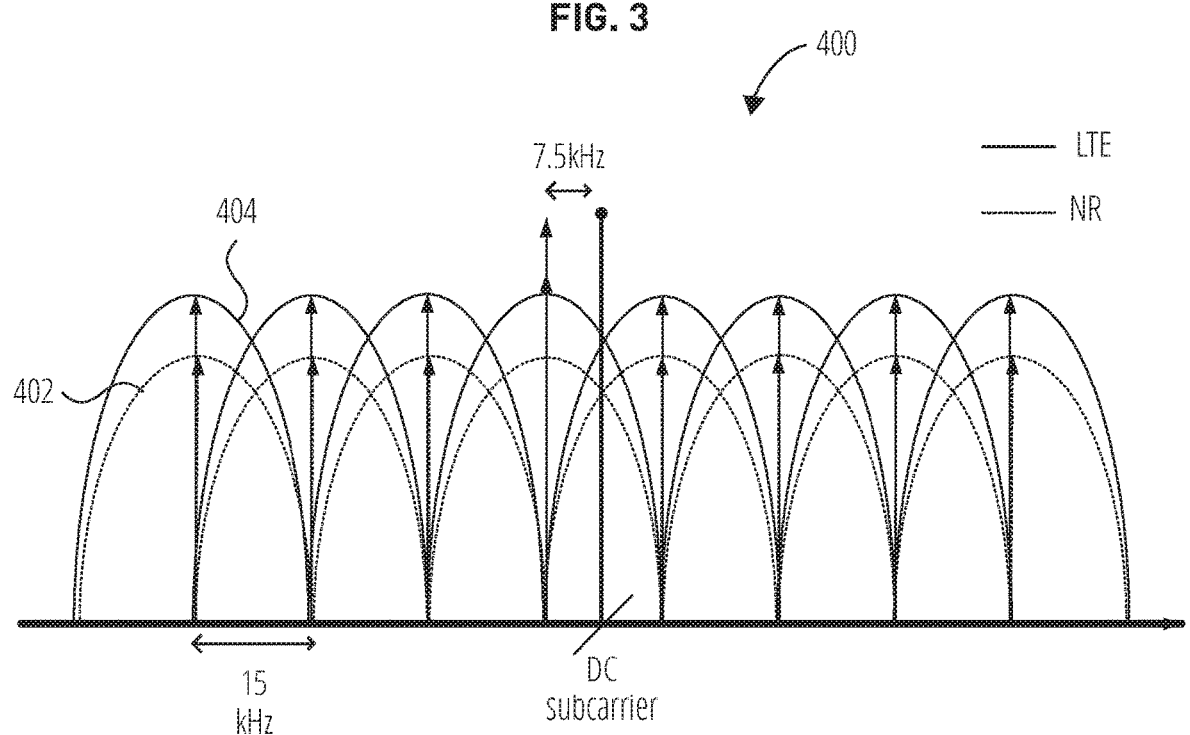
FIG. 4 illustrates a signal plot of NR signal and an LTE signal using DSS in accordance with one embodiment.

FIG. 4 illustrates a signal plot 300 of NR signal 302 and an LTE signal 304 using DSS. As discussed previously, all the LTE UEs use a UL shift (e.g., 7.5 kHz) while the NR UEs remain still using the original DC subcarriers. As shown, this causes the LTE signal 304 and the NR signal 302 for uplink to not remain orthogonal.

Thus, when the network tries to sample the carrier to do a fast Fourier transform (FFT) on the received signal from a composite of UEs transmission, the LTE UEs will create cross up carrier interference because of the shift. In other words, since the LTE UEs shift the UL sub-carriers by 7.5 kHz, there will be inter-subcarrier interference between LTE and NR UL sub-carriers when both LTE and NR UEs transmit at the same time.

To resolve this. NR UEs may also implement a shift to the uplink sub-carrier spacing (e.g., a shift of 7.5 kHz) to align with the LTE sub-carriers to keep the orthogonality. However, the uplink shift requires new UE functionality in the NR UEs to operate in the DSS deployments. 3GPP has introduced several NR bands which can be used for DSS with existing LTE bands. For example, NR bands n38, n40, n48 are expected to be used with DSS with LTE bands 38, 40, 48 respectively.

As the NR UEs only need to use the uplink shift on the shared bands, the NR UEs may be told when to employ the uplink shift. For example, the operation of UL shift by 7.5 kHz may be configured by the network in the operating BWP. For instance, the shift can be configured via broadcast system information (e.g., in SIB1 in initial uplink BWP) and/or in UE dedicated BWPs using a frequencyShift7p5khz field in an information element. Based on the status of the frequencyShift7p5khz field in the FrequencyInfoUL information element, the NR UE may determine whether the cell is implementing DSS, and if the cell is implementing DSS, determine that the NR UE needs shift to align its transmission with LTE UEs.

Introducing the uplink shift for new and existing hands may cause problems for current UEs that do not support the uplink shift. New hands may be introduced over a period of time and usually the newer bands introduced can be implemented by earlier versions of the UE. For example, NR band n40 is planned to be introduced, but already released UEs can also implement/support NR band n40.

Additionally, DSS support can be introduced for new bands or existing bands and correspondingly, can introduce the uplink shift feature for these new/existing bands. For example, for NR n40 uplink shifting support of the sub-carrier may be introduced. Also for the existing NR band (e.g., n38), the DSS functionality may be introduced to operate with LTE band 38. Accordingly, the uplink subcarrier shift feature may also be introduced for these existing hands (e.g., n38).

To provide an example of some of the problems that may be introduced, the following discussing the uplink subcarrier shift feature being introduced to NR band n38, but it should be recognized that this problem can occur for other bands. If DSS functionality is introduced to NR band n38, the uplink sub-carrier shift feature may also be introduced to prevent interference. However, since NR band n38 already exists and there can be UEs which have implemented this band and are already present with the customers, the support of uplink shifting for DSS by the UEs supporting n38 is considered not mandatory. Thus, there can be UEs supporting n38 but not supporting DSS with uplink shifting resulting in interference. So far, 3GPP has introduced (and mandated) the support of uplink shifting for all Frequency Division Duplex (FDD) bands. The support of uplink shifting for DSS in Time Division Duplex (TDD) bands is optional at the UE (as is the ease with band n38).

Problems may occur when there is co-existence of UEs supporting and not supporting uplink shifting in DSS operation, in an existing deployment of DSS where the UEs are connected to the network using DSS, if there are UEs which do the uplink shift of the sub-carriers and if there are also UEs which do not do the uplink shift, then the network may not be able to decode the sub-carriers from the UEs which do not do the uplink shift. The network may only perform the de-modulation of sub-carriers using the uplink shift or without the uplink shift, but not both at the same time. This may result in the uplink transmissions from the UEs which do not do the uplink shift having a decoding error, which results in loss of connection.

To prevent the decoding error, the UEs which do not support the uplink shift may be prevented from camping on the cell that operates DSS with uplink shift. But with the introduction of DSS/uplink shift feature on existing bands, there can be cases of already existing UEs which support the band that are not aware of the newly introduced DSS/uplink shift feature in the existing band. Accordingly, when the UE attempts to access the network using this band, it may result in loss of service. Also, it cannot assume that these UEs will be updated with this information as these UEs are already out in the field with the users/customers.

Embodiments below describe signaling enhancements to handle the case where existing bands are allowed to use DSS with uplink shifting without causing loss of connection to the existing UEs which do not support DSS with uplink shifting. These embodiments may implement adjustments which can be backward compatible.

Figure 5:
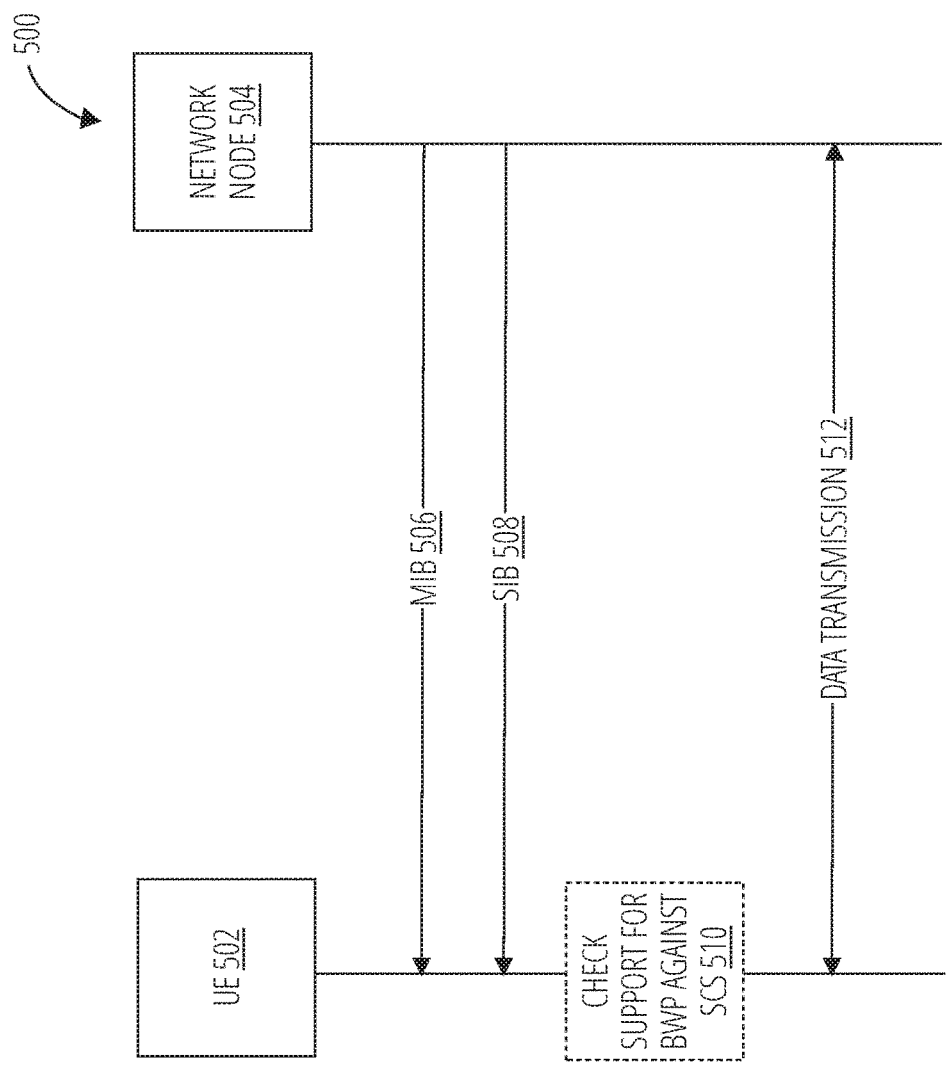
FIG. 5 is a simplified signal flow diagram of a UE accessing a cell in accordance with one embodiment.

FIG. 5 is a simplified signal flow diagram 500 of a UE 502 accessing a cell. In this embodiment, the Network node 504 uses cell-baring with additional filters to prevent or allow certain UEs to access the cell. For example, the Network node 504 may use cell-baring and additional filters to configure the cell to allow any UE to access the cell, limit the access to the cell to those that support DSS and uplink shift, or completely bar UEs.

Simply using cell baring does not provide the flexibility to allow some UEs to access the cell while barring other UEs. Cell barring is used as a tool by the network to prevent UEs from accessing the cell. This may be useful for situations where the network might want to perform some bookkeeping activities, or various other reasons, before opening up the cell. Thus, typically when the network node 504 is in a cell barred state, the network does not want any UE to random-access channel (RACK) and access the cell. With cell-barring only, the network node 504 is only able to enter two states. For example, if the barred state were to only bar those UEs that do not support uplink shifting, there would be no way for the network node 504 to truly bar the cell, it would not be able to prevent the DSS and uplink shift supporting UEs from accessing the cell.

In this embodiment, the network node 504 uses cell-barring with one or more additional filters to signal to the UE more than two states (e.g., truly barred, limited to UEs that support DSS and uplink shift, or not barred). To provide the cell-barring variable and the additional filters, the network node 504 may broadcast one or more messages (e.g., master information block (MIB) 506 and system information block (SIB) 508).

The network node 504 may broadcast a MIB 506. The UE 502 may receive and decode the MIB 506. The NOB 506 may include a cellBarred field that may be set to "allowed" or "notAllowed." Legacy UEs that do not support DSS and uplink shifting will not search for an additional filter. Accordingly, the legacy UEs will simply assume that the cell is barred and not attempt to access the cell if the cellBarred field is set to not allowed.

In contrast, new UEs that support DSS and uplink shifting may be configured to search for one or more additional filters to determine if the cell is totally barred or just barred from legacy UEs that do not support DSS and uplink shifting. For instance, the network node 504 may broadcast additional messages such as the SIB 508 (e.g., SIB1). The UE 502 may receive and decode the SIB 508. The SIB 508 may include the one or more additional filters that instruct the UE 502 concerning the state of the cell. The additional filters may be fields or information elements also broadcast by the network node 504 or sent via a dedicated message to the UE 502.

For example, m some embodiments, the network node 504 may use the cellBarred field in the MIB 506 in addition to a FrequencyInfoUL information element in the SIB 508 to express a cell bar state to the UE 502. The FrequencyInfoUL information element may comprise a frequencyShift7p5khz field. The FrequencyShift7p5khz field may typically represent that the cell supports frequency shift. However, in this embodiment, the FrequencyShift7p5khz field may be used also to provide more context to the cell baring state.

For example, if the network node 504 which supports DSS and uplink shifting wants to truly bar the cell, the network node 504 may broadcast that the cell is barred and also not broadcast that the network node 504 supports DSS and uplink shifting even if it does. In other words, the network node 504 may set the cellBarred field to "barred" and the frequencyShift7p5khz field to "false". With these fields set to barred and false, the UE 502 that supports the DSS with uplink shift will not attempt to access the cell.

If the network node 504 wants to allow access to UEs which support DSS and uplink shifting and bar legacy UEs that do not support DSS and uplink shifting, the network node 504 may set the cell Barred field to "barred" and the frequencyShift7p5khz field to "true". If the fields are set to barred and true, the network may indicate that the UEs which support OSS with uplink shift are allowed to access the cell. Accordingly, if the UE 502 which support DSS and uplink shifting determines that these fields are set to barred and true, the UE 502 may access the cell.

If the network node 504 wants to allow all UEs to access the cell, the network node 504 may set the cellBarred field to "not-barred". This setting may allow all UEs to access the cell.

In other embodiments, the one or more additional filters may be a new field which the network node 504 may broadcast. The new field may be an exemption field which explicitly expresses whether the UEs which support DSS with uplink shift are allowed to camp or not when the cell barred field is set to barred. If the cell is barred (i.e., cellBarred field to "barred") but the new field says the UEs are allowed to camp if the UEs support DSS with uplink shift, the UEs which support DSS with uplink shift may access the cell. If the cell is barred and the new field says the UEs are not allowed to camp even if the UEs support DSS with UL-shift, the cell is considered to be truly barred and no UE is allowed to access the cell.

Adding this new field may allow the flexibility at the network to not modify any existing broadcast, but only change the new field along with the cell barring field. In this embodiment, the network node 504 sets cellBarred to 'hatred' and keeps the value of frequencyShift7p5khz the same, but a new field is added in a broadcast message (e.g., SIB1) that says whether the UEs which support DSS with uplink shifting are allowed to camp or if they are barred as well. Thus, in this embodiment, the initial BWP configuration which carriers frequencyShift7p5khz, is not changed.

The UE 502 may also check 510 support for BWP against a particular sub-carrier spacing to determine if the UE 502 is barred or not. The information element comprising the frequencyShift7p5khz field or the new exemption field may be defined per BWP.

In some embodiments, if the network node 504 intends to use DSS with uplink shift only with a particular sub-carrier spacing (SCS) (e.g., with 15 kHz SCS), but not with 30 kHz SCS (configured using a separate BWP), then the barring of the cell by the UE could be based on the UE support of uplink shift on the initial BWP In other words, when the cellBarred field is set to true, the UE 502 may check for support of OSS and uplink shift only for the initial BWP against the SCS the initial BWP is configured with.

In some embodiments, if the network node 504 intends to use DSS with uplink shift only with a particular sub-carrier spacing (SCS) (e.g., with 15 kHz SCS), but not with 30 kHz SCS (configured using a separate BWP), then the barring of the cell by the UE 502 could be based on the UE support of DSS with uplink shift on configured BWPs. In other words, when the cellBarred field is set to true, the UE 502 may check for support of DSS and uplink shift for all the BWPs against the SCS the broadcasted information provides. The UE 502 may access the cell when the UE 502 supports DSS with uplink shift for all BWPs and the SCS the UE supports.

After the UE 502 determines it may access the cell, the UE 502 is able to communicate with the network node 504 and transmit 512 data.

Figure 6:
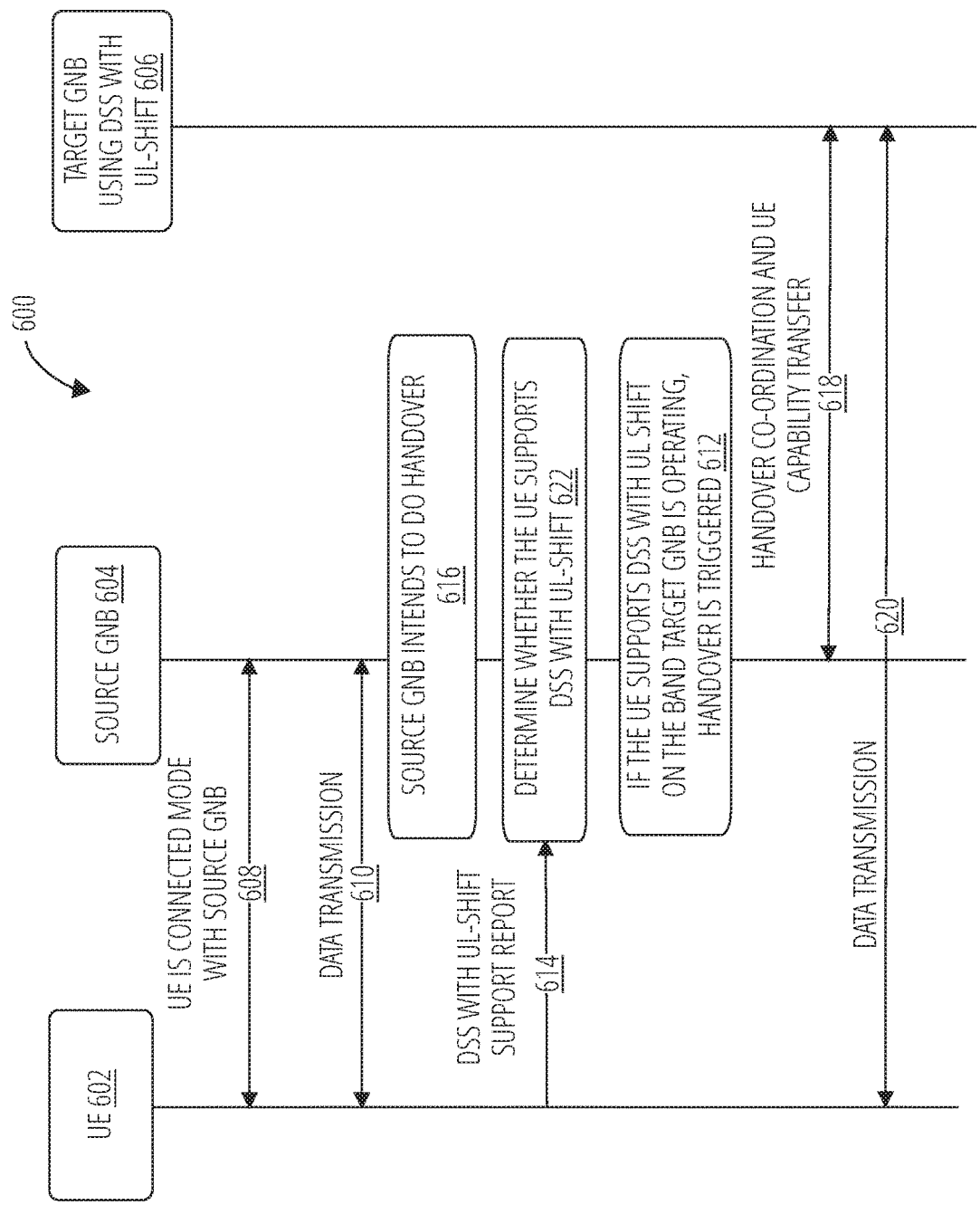
FIG. 6 is a simplified signal flow diagram of a handover between a source gNB and a target gNB using DSS with uplink shifting in accordance with one embodiment.

FIG. 6 is a simplified signal flow diagram 600 of a handover between a source gNB 604 and a target gNB 606 using DSS with uplink shifting. As shown, the UE 602 may be in connected mode 608 with the source gNB 604. The UE 602 and the source gNB 604 may engage in data transmission 610.

The source gNB 604 may at some point intend 616 to do a handover of the UE 602. However, the target gNB 606 may be using DSS with uplink shift while the source gNB 604 did not. As a result, the source gNB 604 may not now the UEs capability of using DSS with uplink shift.

In the illustrates embodiment, the UE to signals to the source gNB 604 a report 614 about its support of DSS with UL-shifting. In some embodiments, the report 614 may indicate DSS with uplink shifting capability for each band that the UE supports (e.g., whether DSS with uplink shifting, is possible for each of these bauds).

The DSS and uplink shifting information may be used by the source gNB 604 to determine whether to proceed with the handover. In the illustrated embodiment, if the UE supports DSS with UL shift on the band target gNB 606 is operating, handover is triggered 612. If the UE 602 does not support DSS with uplink shift, the source gNB 604 does not handover the UE 602 to the target gNB 606. In some embodiments, the source gNB 604 may check that the UE 602 supports uplink shift for all the BWPs against a SCS. In some embodiments, the source gNB 604 may check that the UE 602 supports uplink shift only for an initial BWP against a particular SCS where the initial BWP is configured for the target network node.

The source gNB 604 may perform 618 handover co-ordination and UE capability transfer. In some embodiments, this may include providing the information from the report 614 indicating DSS with uplink shifting capability for each band that the UE supports. After the handover, the UE 602 and the target gNB 606 may transmit 620 data.

Figure 7:
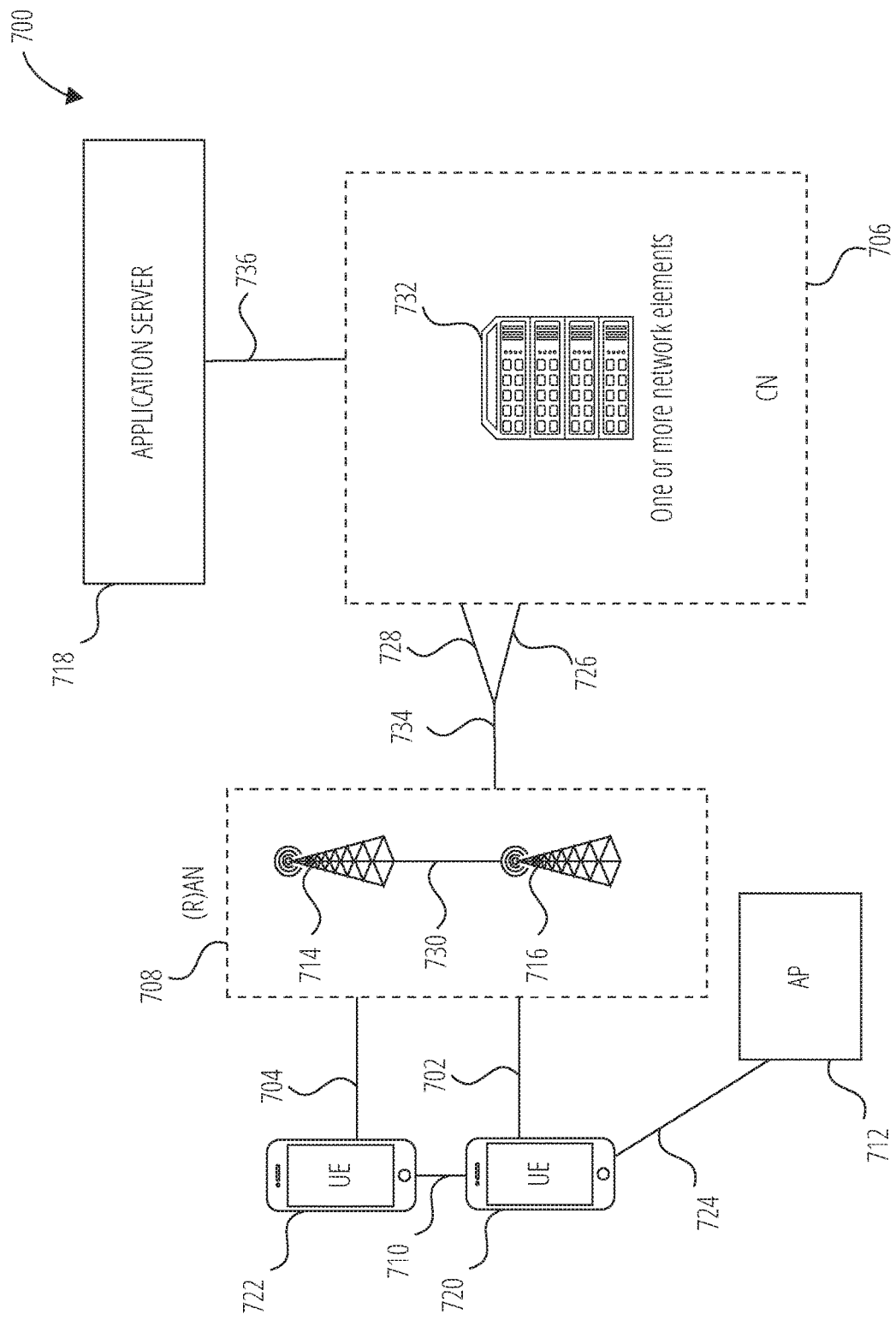
FIG. 7 illustrates a system in accordance with one embodiment.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 722 and UE 720. In this example, the UE 722 and the UE 720 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 722 and/or the UE 720 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections, lire IoT UEs may execute background applications (e.g., keep-alive messages, status updates, etc.) to facilitate the connections of the IoT network.

The UE 722 and UE 720 may be configured to connect, for example, communicatively couple, with an access node or radio access node (shown as (R)AN 708). In embodiments, the (R)AN 708 may be an NG RAN or a 5G RAN, an E-UTRAN, or a legacy RAN, such as a UTRAN or GERAN. As used herein, the term "NG RAN" or the like may refer to a (R)AN 708 that operates in an NR or 5G system, and the term "E-UTRAN" or the like may refer to a (R)AN 708 that operates in an LTE or 4G system. The UE 722 and UE 720 utilize connections (or channels) (shown as connection 704 and connection 702 respectively), each of which comprises a physical communications interface or layer (discussed in further detail below).

In this example, the connection 704 and connection 702 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and or any of the other communications protocols discussed herein. In embodiments, the UE 722 and UE 720 may directly exchange communication data via a ProSe interface 710. The ProSe interface 710 may alternatively be referred to as a sidelink (SL) interface 110 and may comprise one or more logical channels, including but not limited to a PSCCH, a PSSCH, a PSDCH, and a PSBCH.

The UE 720 is shown to be configured to access an AP 712 (also referred to as "WLAN node," "WLAN," "WLAN Termination," "WT" or the like) via connection 724. The connection 724 can comprise a local wireless connection, such as a connection consistent with any IEEE 802.11 protocol, wherein the AP 712 would comprise a wireless fidelity (Wi-Fi®) router. In this example, the AP 712 may be connected to the Internet without connecting to the core network of the wireless system (described in further detail below). In various embodiments, the UE 720, (R)AN 708, and AP 712 may be configured to utilize LWA operation and/or LWIP operation. The LWA operation may involve the UE 720 in RRC_CONNECTED being configured by the RAN node 714 or the RAN node 716 to utilize radio resources of LTE and WLAN. LWIP operation may involve the UE 720 using WLAN radio resources (e.g., connection 724) via IPsec protocol tunneling to authenticate and encrypt packets (e.g., IP packets) sent over the connection 724. IPsec tunneling may include encapsulating the entirety of original IP packets and adding a new packet header, thereby-protecting the original header of the IP packets.

The (R)AN 708 can include one or more AN nodes, such as RAN node 714 and RAN node 716, that enable the connection 704 and connection 702. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB) and the term "E-UTRAN node" or the like may refer to a RAN node that operates in an LTE or 4G system 700 (e.g., an eNB). According to various embodiments, the RAN node 714 or RAN node 716 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 714 or RAN node 716 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 714 or RAN node 716); a MAC/PHY split wherein RRC, PDCP, RLC, and MAC layers are operated by the CRAN/vBBUP and the PHY layer is operated by individual RAN nodes (e.g., RAN node 714 or RAN node 716); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 714 or RAN node 716 to perform other virtualized applications. In some implementations, an individual RAN node may represent individual gNB-DUs that are connected to a gNB-CU via individual F1 interfaces (not shown by FIG. 7). In these implementations, the gNB-DUs may include one or more remote radio heads or RFEMs, and the gNB-CU may be operated by a server that is located in the (R)AN 708 (not shown) or by a server pool in a similar manner as the CRAN/vBBUP. Additionally, or alternatively, one or more of the RAN node 714 or RAN node 716 may be next generation eNBs (ng-eNBs), which are RAN nodes that provide E-UTRA user plane and control plane protocol terminations toward the UE 722 and UE 720, and are connected to an 5GC via an NG interface (discussed infra). In V2X scenarios one or more of the RAN node 714 or RAN node 716 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "U E-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very-low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 714 and/or the RAN node 716 can terminate the air interface protocol and can be the first point of contact for the UE 722 and UE 720. In some embodiments, the RAN node 714 and/or the RAN node 716 can fulfill various logical functions for the (R)AN 708 including, but not limited to, radio network controller (RNC) functions such as radio bearer management, uplink and downlink dynamic radio resource management and data packet scheduling, and mobility management.

In embodiments, the UE 722 and UE 720 can be configured to communicate using OFDM communication signals with each other or with the RAN node 714 and/or the RAN node 716 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 714 and/or the RAN node 716 to the UE 722 and UE 720, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 722 and UE 720 and the RAN node 714 and/or the RAN node 716 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 722 and UE 720 and the RAN node 714 or RAN node 716 may operate using LAA, eLAA, and/or feLAA mechanisms. In these implementations, the UE 722 and UE 720 and the RAN node 714 or RAN node 716 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (tor example, UE 722 and UE 720, RAN node 714 or RAN node 716, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LA A networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 722. AP 712, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA each aggregated carrier is referred to as a CCACC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the band widths of each CC is usually the same for DL and UL.

CA also comprises individual serving cells to provide individual CCs. The coverage of the serving cells may differ, for example, because CCs on different frequency bands will experience different pathless. A primary service cell or PCell may provide a PCC for both UL and DL, and may handle RRC and NAS related activities. The Other serving cells are referred to as SCells, and each SCell may provide an individual SCC for both UL and DL. The SCCs may be added and removed as required, while changing the PCC may require the UE 722 to undergo a handover. In LAA, eLAA, and fcLAA, some or all of the SCells may operate in the unlicensed spectrum (referred to as "LAA SCells") and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 722 and UE 720. The PDCCH carries information about the transport format and resource allocations related to the PDSCH channel, among other things. It may also inform the UE 722 and UE 720 about the transport format, resource allocation, and HARQ information related to the uplink shared channel. Typically, downlink scheduling (assigning control and shared channel resource blocks to the UE 720 within a cell) may be performed at any of the RAN node 714 or RAN node 716 based on channel quality information fed back from any of the UE 722 and UE 720. The downlink resource assignment information may be sent on the PDCCH used for (e.g., assigned to) each of the UE 722 and UE 720.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs Similar to above, each ECCF may correspond to nine sets of four physical resource elements known as an EREGs. An ECCE may have other numbers of EREGs in some situations.

The RAN node 714 or RAN node 716 may be configured to communicate with one another via interface 730. In embodiments where the system 700 is an LTE system (e.g., when CN 706 is an EPC) the interface 730 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 722 front an SeNB for user data; information of PDCP PDUs that were not delivered to a UE 722; information about a current minimum desired buffer size at the Se NB for transmitting to the UE user data, and the like. The X2-C may provide intra-LTE access mobility functionality, including context transfers from source to target eNBs, user plane transport control, etc.; load management functionality; as well as inter-cell interference coordination functionality.

In embodiments where the system 700 is a SG or NR system (e.g., when CN 706 is an SGC), the interface 730 may be an Xn interface. The Xn interface is defined between two or more RAN nodes (e.g., two or more gNBs and the like) that connect to SGC, between a RAN node 714 (e.g., a gNB) connecting to SGC and an eNB, and/or between two eNBs connecting to SGC (e.g., CN 706). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 722 in a connected mode (e.g., CM-CONNECTED) including functionality to manage the UE mobility for connected mode between one or more RAN node 714 or RAN node 716. The mobility support may include context transfer from an old (source) serving RAN node 714 to new (target) serving RAN node 716; and control of user plane tunnels between old (source) serving RAN node 714 to new (target) serving RAN node 716. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stacks) shown and described herein.

The (R)AN 708 is shown to be communicatively coupled to a core network-in this embodiment, CN 706. The CN 706 may comprise one or more network elements 732, which are configured to offer various data and telecommunications services to customers/subscribers (e.g., users of UE 722 and UE 720) who are connected to the CN 706 via the (R)AN 708. The components of the CN 706 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 706 may be referred to as a network slice, and a logical instantiation of a portion of the CN 706 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 718 may be an element offering applications that use IP bearer resources with the core network (e.g., UMTS PS domain, LTE PS data services, etc.). The application server 718 can also be configured to support one or more communication services (e.g., VoIP sessions, PTT sessions, group communication sessions, social networking services, etc.) for the UE 722 and UE 720 via the EPC. The application server 78 may communicate with the CN 706 through an IP communications interface 736.

In embodiments, the CN 706 may be an SGC and the (R)AN 116 may be connected with the CN 706 via an NG interlace 734. In embodiments, the NG interface 734 may be split into two parts, an NG user plane (NG-U) interface 726, which carries traffic data between the RAN node 714 or RAN node 716 and a UPF, and the SI control plane (NG-C) interface 728, which is a signaling interface between the RAN node 714 or RAN node 716 and AMFs.

In embodiments, the CN 706 may be a 5G CN, while in other embodiments, the CN 706 may be an EPC). Where CN 706 is an HPC the (R)AN 116 may be connected with the CN 706 via an S1 interface 734. In embodiments, the S1 interface 734 may be split into two parts, an S1 user plane (S1-U) interface 726, which carries traffic data between the RAN node 714 or RAN node 716 and the S-GW, and the S1-MME interface 728, which is a signaling interface between the RAN node 714 or RAN node 716 and MMEs.

Figure 8:
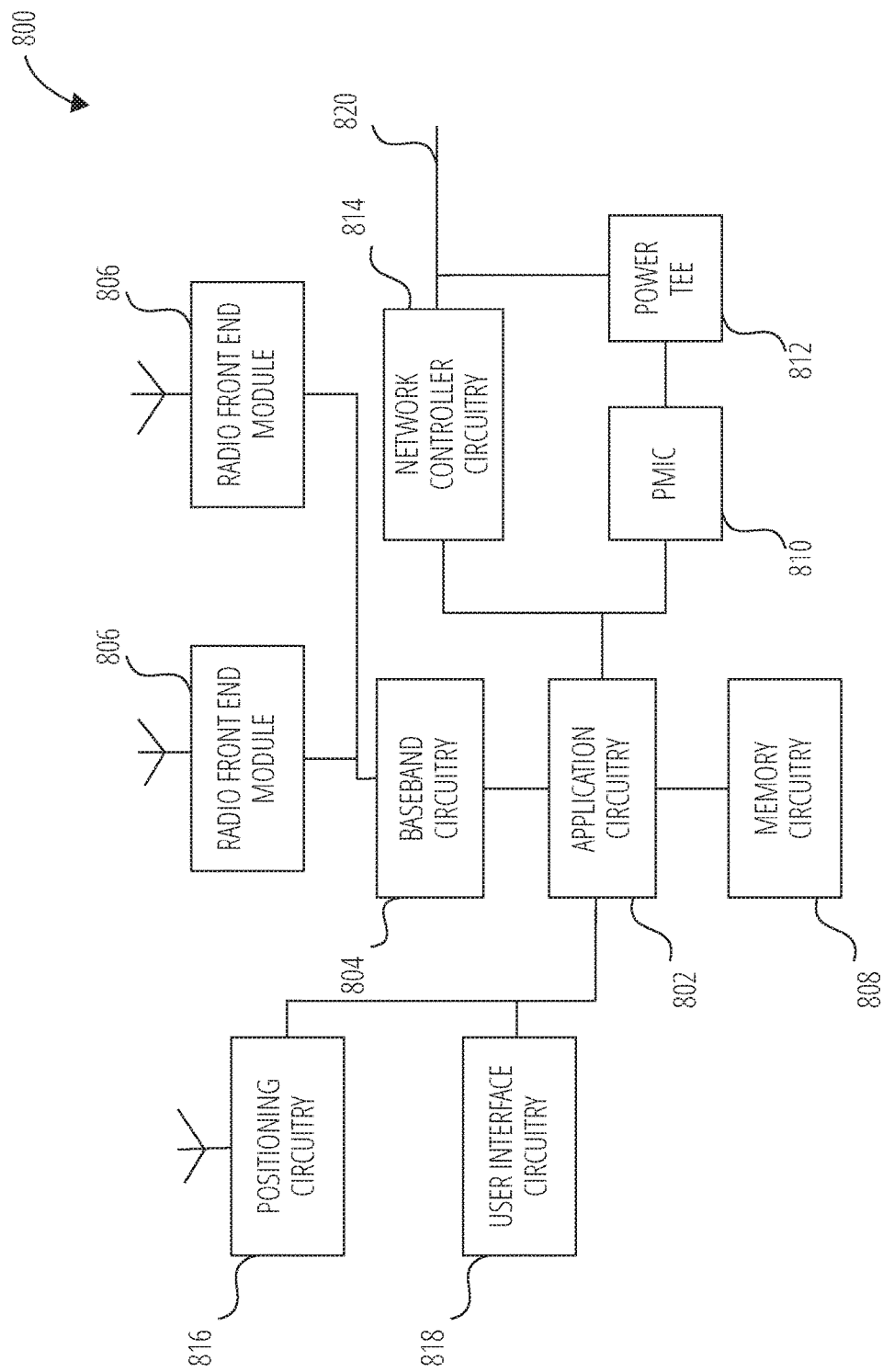
FIG. 8 illustrates an infrastructure equipment in accordance with one embodiment.

FIG. 8 illustrates an example of infrastructure equipment 800 in accordance with various embodiments. The infrastructure equipment 800 may be implemented as a base station, radio head, RAN node, AN, application server, and/or any other element/device discussed herein. In other examples, the infrastructure equipment 800 could be implemented in or by a UE.

The infrastructure equipment 800 includes application circuitry 802, baseband circuitry 804 one or more radio from end module 806 (RFEM), memory circuitry 808 power management integrated circuitry (shown as PMIC 810), power tee circuitry 812, network controller circuitry 814, network interface connector 820, satellite positioning circuitry 816, and user interface circuitry 818. In some embodiments, the device infrastructure equipment 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 802 includes circuitry such as, but not limited to one or more processors (or processor cores), cache memory, and one or more of low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces. Mobile Industry Processor Interface (MIPI) interfaces and Joint Test Access Group (JTAG) test access ports. The processors (or cores) of the application circuitry 802 may be coupled with or may include memory/storage elements and may be configured to execute instructions stored in the memory/storage to enable various applications or operating systems to run on the infrastructure equipment 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processors) of application circuitry 802 may include, for example, one or more processor cotes (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs one or more ASICs, one or more microprocessors or controllers, or any suitable combination thereof. In some embodiments, the application circuitry 802 may comprise, or may be, a special-purpose processor/controller to operate according to the various embodiments herein. As examples, the processor(s) of application circuitry 802 may include one or more Intel Pentium®, Core®, or Xcon® processor(s); Advanced Micro Devices (AMD) Ryzen® processor(s). Accelerated Processing Units (APUs) or Epyc® processors; ARM-based processor(s) licensed from ARM Holdings, Ltd such as the ARM Cortex-A family of processors and the ThunderX2® provided by Cavium™, Inc.; a MiPS-based design from MIPS Technologies, Inc. such as MIPS Warrior P-class processors; and/or the like. In some embodiments, the infrastructure equipment 800 may not utilize application circuitry 802, and instead may include a special-purpose processor controller to process IP data received from an EPC or 5GC, for example.

In some implementations, the application circuitry 802 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 802 may comprise logic blocks or logic fabric, and other interconnected resources that may be programmed to perform various functions, such as the procedures, methods, functions, etc. of the various embodiments discussed herein In such embodiments, the circuitry of application circuitry 802 may include memory cells (e.g., erasable programmable read-only memory (EPROM), electrically erasable programmable read-only memory (EEPROM), flash memory, static memory (e.g., static random access memory(SRAM), anti-fuses, etc.)) used to store logic blocks, logic fabric, data, etc. in look-up-tables (LUTs) and the like. The baseband circuitry 804 may be implemented, for example, as a solder-down substrate including one or more integrated circuits, a single packaged integrated circuit soldered to a main circuit board or a multi-chip module containing two or more integrated circuits.

The user interface circuitry 818 may include one or more user interfaces designed to enable user interaction with the infrastructure equipment 800 or peripheral component interfaces designed to enable peripheral component interaction with the infrastructure equipment 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 806, which incorporates both mmWave antennas and sub-mmWave.

The memory circuitry 808 may include one or more of volatile memory including dynamic random access memory (DRAM) and or synchronous dynamic random access memory (SDRAM), and nonvolatile memory (NVM) including high-speed electrically erasable memory (commonly referred to as Flash memory), phase change random access memory (PRAM), magnetoresistive random access memory(MRAM) etc., and may incorporate the three-dimensional (3D)cross-point (XPOINT) memories from Intel® and Micron®. The memory circuitry 808 may be implemented as one or more of solder down packaged integrated circuits, socketed memory modules and plug-in memory cards.

The PMIC 810 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 812 may provide for electrical power drawn from a network cable to provide both power supply and data connectivity to the infrastructure equipment 800 using a single cable.

The network controller circuitry 814 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 820 using a physical connection, which may be electrical (commonly referred to as a "copper interconnect"), optical, or wireless. The network controller circuitry 814 may include one or more dedicated processors and/or FPGAs to communicate using one or more of the aforementioned protocols In some implementations, the network controller circuitry 814 may include multiple controllers to provide connectivity to other networks using the same or different protocols.

The positioning circuitry 816 includes circuitry to receive and decode signals transmitted/broadcasted by a positioning network of a global navigation satellite system (GNSS). Examples of navigation satellite constellations (or GNSS) include United States, Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 816 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 816 may include a Micro-Technology for Positioning, Navigation, and Timing (Micro-PNT) IC that uses a master timing clock to perform position tracking/estimation without GNSS assistance. The positioning circuitry 816 may also be part of or interact with, the baseband circuitry 804 and/or radio front end module 806 to communicate with the nodes and components of the positioning network. The positioning circuitry 816 may also provide position data and/or time data to the application circuitry 802, which may use the data to synchronize operations with various infrastructure, or the like. The components shown by FIG. 8 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus among others.

Figure 9:
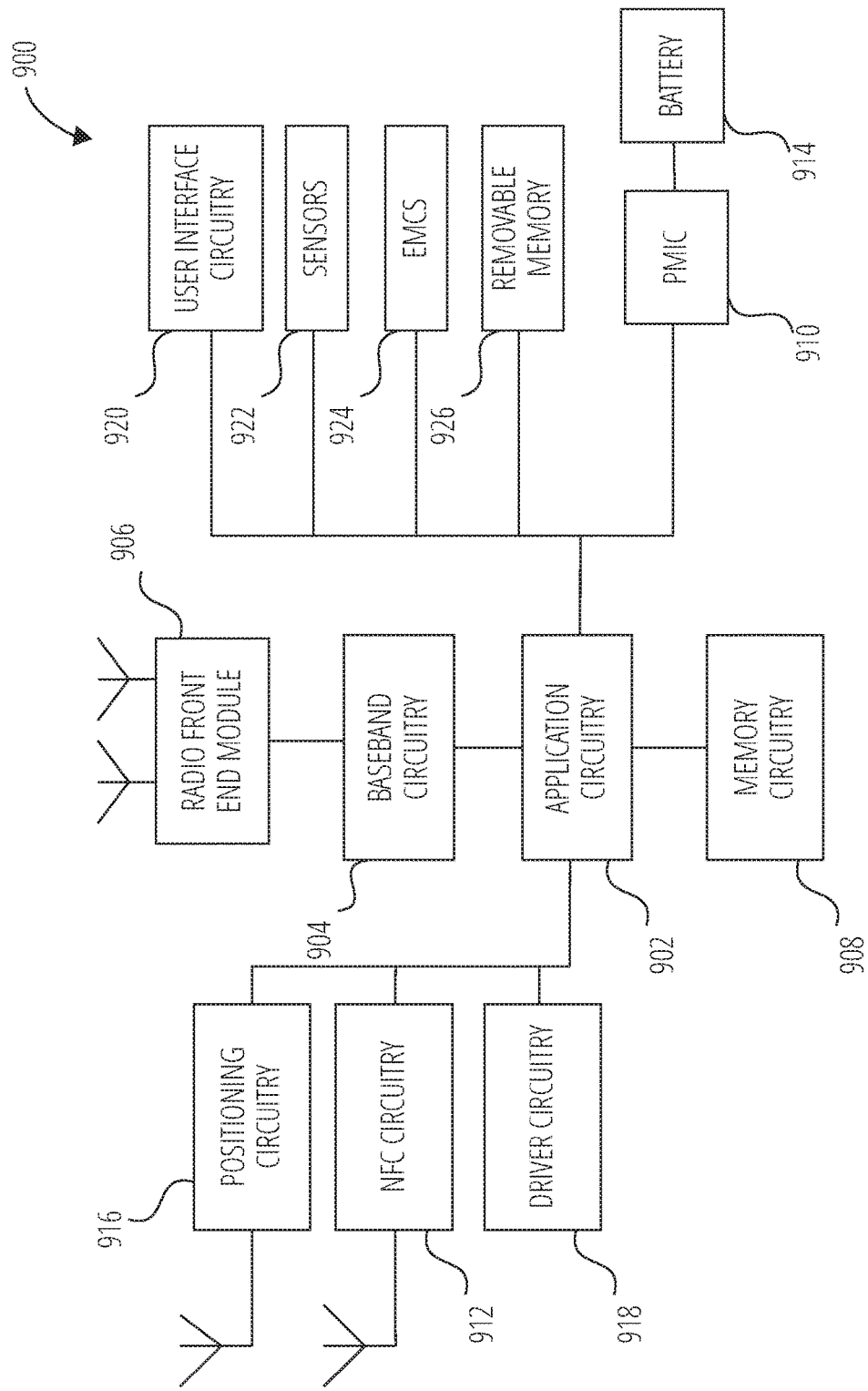
FIG. 9 illustrates a platform in accordance with one embodiment.

FIG. 9 illustrates an example of a platform 900 in accordance with various embodiments. In embodiments, the computer platform 900 may be suitable for use as UEs, application servers, and or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 902 includes circuitry such as, but not limited to one or more processors (or processor cores), cache memory, and one or more of LDOs, interrupt controllers, serial interfaces such as SPI, I²C or universal programmable serial interface module, RTC, timer-cunters including interval and watchdog timers, general purpose 10, memory card controllers such as SD MMC or similar, USB interfaces, MIP1 interfaces, and JTAG test access ports. The processors (or cores) of the application circuitry 902 may be coupled with or may include memory/storage elements and may be configured to execute instructions stored in the memory/storage to enable various applications or operating systems to run on the platform 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 902 may comprise, or may be, a special-purpose processor/controller to operate according to the various embodiments herein.

As examples, the processors) of application circuitry 902 may include an Intel® Architecture Core™ based processor, such as a Quark™, an Atom™, an i3, an i5, an i7, or an MCU-class processor, or another such processor available from Intel® Corporation. The processors of the application circuitry 902 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class. Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 902 may be a part of a system on a chip (SoC) in which the application circuitry 902 and other components are formed into a single integrated circuit, or a single package, such as the Edison™ or Galileo™ SoC boards from Intel® Corporation.

Additionally or alternatively, application circuitry 902 may include circuitry such as, but not limited to one or more a field-programmable devices (FPDs) such as FPGAs and the like; programmable logic devices(PLDs) such as complex PLDs (CPLDs), high-capacity PLDs (HCPLDs) and the like; ASICs such as structured ASICs and the like; programmable SoCs (PSoCs); and the like. In such embodiments, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 904 may be implemented, for example, as a solder-down substrate including one or more integrated circuits, a single packaged integrated circuit soldered to a main circuit board or a multi-chip module containing two or more integrated circuits.

The radio front end module 906 may comprise a millimeter wave (mmWave) radio front end module (RFEM) and one or more sub-mm Wave radio frequency integrated circuits (RFICs). In some implementations, the one or more sub-mm Wave RFICs may be physically separated from the mmWave RFEM. The RFICs may include connections to one or more antennas or antenna arrays, and the RFEM may be connected to multiple antennas, in alternative implementations, both mmWave and sub-mmWave radio functions may be implemented in the same physical radio front end module 906, which incorporates both mm Wave antennas and sub-mmWave.

The memory circuitry 908 may include any number and type of memory devices used to provide for a given amount of system memory. As examples, the memory circuitry 908 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 908 may be developed in accordance with a Joint Electron Devices Engineering Council (JEDEC) low power double data rate (LPDDR)-based design, such as LPDDR2, LPDDR3, LPDDR4, or the like. Memory circuitry 908 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs and/or soldered onto a motherboard via a ball grid array (BOA). In low power implementations, the memory circuitry 908 maybe on-die memory or registers associated with the application circuitry 902. To provide for persistent storage of information such as data, applications, operating systems and so forth, memory circuitry 908 may include one or more mass storage devices, which may include, inter alia, a solid state disk drive (SSDD), hard disk drive(HDD), a microHDD, resistance change memories, phase change memories, holographic memories, or chemical memories, among others. For example, the computer platform 900 may incorporate the three-dimensional (3D) cross-point (XPOINT) memories from Intel® and Micron®.

The removable memory 926 may include devices, circuitry, enclosures/housings, ports or receptacles, etc. used to couple portable data storage devices with the platform 900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 900 may also include interface circuitry (not shown) that is used to connect external devices with the platform 900. The external devices connected to the platform 900 via the interface circuitry include sensors 922 and electro-mechanical components (shown as EMCs 924) as well as removable memory devices coupled to removable memory 926.

The sensors 922 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 924 include devices, modules, or subsystems whose purpose is to enable platform 900 to change its state, position, and/or orientation, or move or control a mechanism or (sub)system. Additionally, EMCs 924 may be configured to generate and send messages/signaling to other components of the platform 900 to indicate a current state of the EMCs 924. Examples of the EMCs 924 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/oi other like electromechanical components. In embodiments, platform 900 is configured to operate one or more EMCs 924 based on one or more captured events and/or instructions or control signals received from a service provider and/or various clients. In some implementations, the interface circuitry may connect the platform 900 with positioning circuitry 916. The positioning circuitry 916 includes circuitry to receive and decode signals transmitted/broadcasted by a positioning network of a GNSS. Examples of navigation satellite constellations (or GNSS)include United States' GPS, Russia's GLONASS, the European Union's Galileo system. China's BeiDou Navigation Satellite System, a regional navigation system or GNSS augmentation system (e.g., NAVIC), Japan's QZSS, France's DORIS, etc.), or the like. The positioning circuitry 916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 916 may include a Micro-PNT IC that uses a master timing clock to perform position tracking/estimation without GNSS assistance. The positioning circuitry 916 may also be part of, or interact with, the baseband circuitry 904 and/or radio front end module 906 to communicate with the nodes and components of the positioning network. The positioning circuitry 916 may also provide position data and/or time data to the application circuitry 902, which may use the data to synchronize operations with various infrastructure (e.g., radio base stations), for turn-by-turn navigation applications, or the like.

In some implementations, the interface circuitry may connect the platform 900 with Near-Field Communication circuitry (shown as NFC circuitry 912). The NFC circuitry 912 is configured to provide contactless, short-range communications based on radio frequency identification (RFID) standards, wherein magnetic field induction is used to enable communication between NFC circuitry 912 and NFC-enabled devices external to the platform 900 (e.g., an "NFC touchpoint"). NFC circuitry 912 comprises an NFC controller coupled with an antenna element and a processor coupled with the NFC controller. The NFC controller may be a chip/IC providing NFC functionalities to the NFC circuitry 912 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 912, or initiate data transfer between the NFC circuitry 912 and another active NFC device (e.g., a smartphone or an NFC-enabled POS terminal) that is proximate to the platform 900.

The driver circuitry 918 may include software and hardware elements that operate to control particular devices that are embedded in the platform 900, attached to the platform 900, or otherwise communicatively coupled with the platform 900. The driver circuitry 918 may include individual drivers allowing other components of the platform 900 to interact with or control various input/output (I/O) devices that may be present within, or connected to, the platform 900. For example, driver circuitry 918 may include 3 display driver to control and allow access to a display device, a touchscreen driver to control and allow access to a touchscreen interface of the platform 900, sensor drivers to obtain sensor readings of sensors 922 and control and allow access to sensors 922, EMC, drivers to obtain actuator positions of the EMC's 924 and/or control and allow access to the EMCs 924, a camera driver to control and allow access to an embedded image capture device, audio drivers to control and allow access to one or more audio devices.

The power management integrated circuitry (shown as PMIC 910) (also referred to as "power management circuitry") may manage power provided to various components of the platform 900. In particular, with respect to the baseband circuitry 904, the PMIC 910 may control power-source selection, voltage scaling, battery charging, or DC-to-DC conversion. The PMIC 910 may often be included when the platform 900 is capable of being powered by a battery 914 for example, when the device is included in a UE.

In some embodiments, the PMIC 910 may control, or otherwise be part of, various power saving mechanisms of the platform 900. For example, if the platform 900 is in an RRC_Connected state, where it is still connected to the RAN node as it expects to receive traffic shortly, then it may enter a state known as Discontinuous Reception Mode (DRX) after a period of inactivity. During this state, the platform 900 may power down for brief intervals of time and thus save power. It there is no data traffic activity for an extended period of time, then the platform 900 may transition off to an RRC_Idle state, where it disconnects from the network and does not perform operations such as channel quality feedback, handover, etc. The platform 900 goes into a very low power state and it performs paging where again it periodically wakes up to listen to the network and then powers down again. The platform 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 914 may power the platform 900, although in some examples the platform 900 may be mounted deployed in a fixed location, and may have a power supply coupled to an electrical grid. The battery 914 may be a lithium ion battery, a metal-air battery, such as a zinc-air battery, an aluminum-air battery, a lithium-air battery, and the like. In some implementations, such as in V2X applications, the battery 914 may be a typical lead-acid automotive battery.

In some implementations, the battery 914 may be a "smart battery," which includes or is coupled with a Battery Management System (BMS) or battery monitoring integrated circuitry. The BMS may be included in the platform 900 to track the state of charge (SoCh) of the battery 914. The BMS may be used to monitor other parameters of the battery 914 to provide failure predictions, such as the state of health (SoH) and the state of function (SoF) of the battery 914. The BMS may communicate the information of the battery 914 to the application circuitry 902 or other components of the platform 900. The BMS may also include an analog-to-digital (ADC) convertor that allows the application circuitry 902 to directly monitor the voltage of the battery 914 or the current flow from the battery 914. The battery parameters may be used to determine actions that the platform 900 may perform, such as transmission frequency, network operation, sensing frequency, and the like.

A power block, or other power supply coupled to an electrical grid may be coupled with the BMS to charge the battery 914. In some examples, the power block may be replaced with a wireless power receiver to obtain the power wirelessly, for example, through a loop antenna in the computer platform 900. In these examples, a wireless battery charging circuit may be included in the BMS. The specific charging circuits chosen may depend on the size of the battery 914, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 920 includes various input/output (I/O) devices present within, or connected to, the platform 900, and includes one or more user interfaces designed to enable user interaction with the platform 900 and/or peripheral component interfaces designed to enable peripheral component interaction with the platform 900. The user interface circuitry 920 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator positions), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD). LED displays, quantum dot displays, projectors, etc.), with the output of characters, graphics, multimedia objects, and the like being generated or produced from the operation of the platform 900. The output device circuitry may also include speakers or other audio emitting devices, printers), and/or the like. In some embodiments, the sensors 922 may be used as the input device circuitry (e.g., an image capture device, motion capture device, or the like) and one or more EMCs may be used as the output device circuitry (e.g., an actuator to provide haptic feedback or the like) In another example, NFC circuitry comprising an NFC controller coupled with an antenna element and a processing device may be included to read electronic tags and/or connect with another NFC-enabled device. Peripheral component interfaces may include, but are not limited to a non-volatile memory port, a USB port, an audio jack, a power supply interface, etc.

Although not shown, the components of platform 900 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 10:
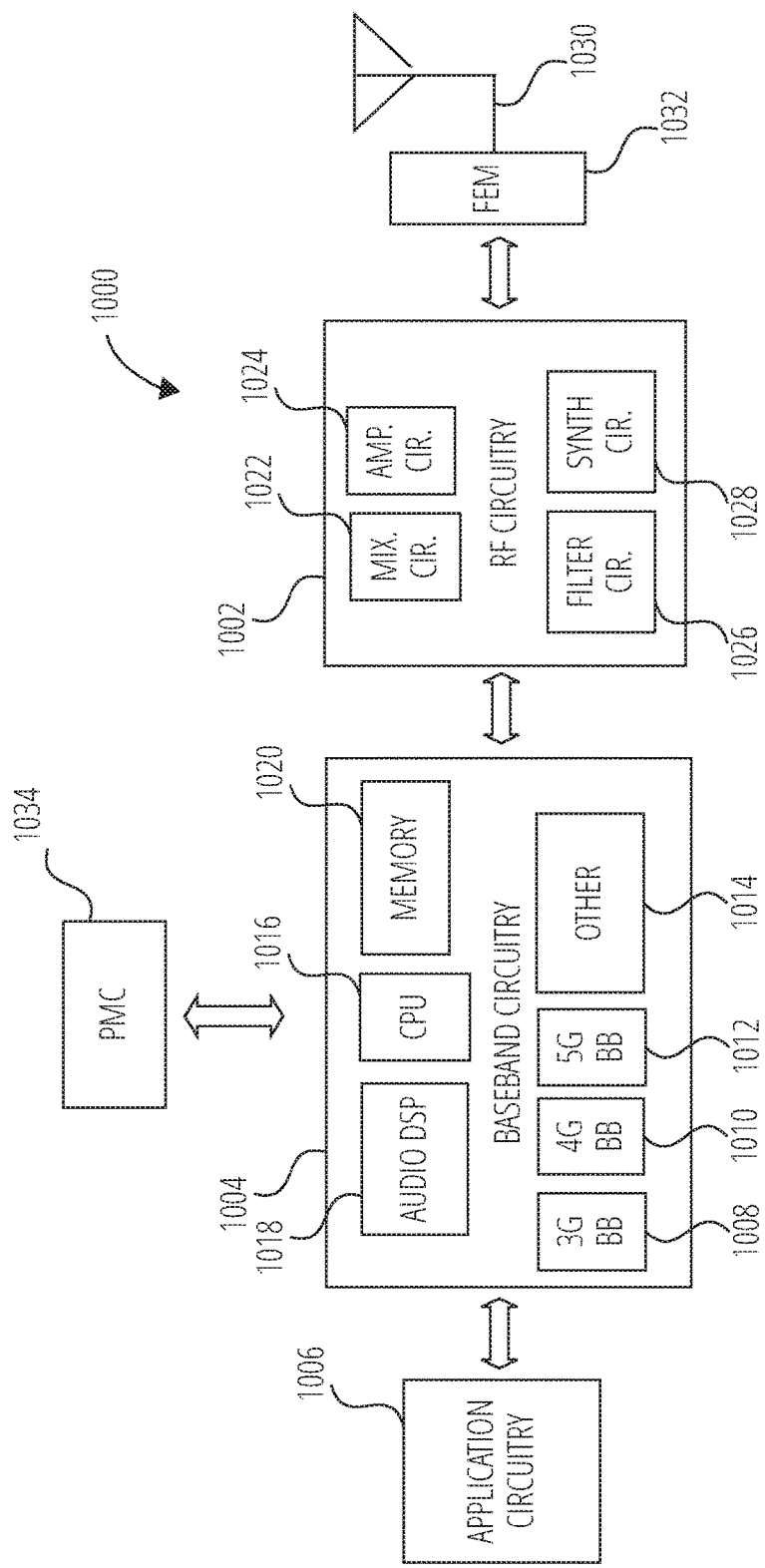
FIG. 10 illustrates a device in accordance with one embodiment.

FIG. 10 illustrates example components of a device 1000 in accordance with some embodiments, in some embodiments, the device 1000 may include application circuitry 1006, baseband circuitry 1004. Radio Frequency (RF) circuitry (shown as RF circuitry 1002) front-end module (FEM) circuitry (shown as FEM circuitry 1032), one or more antennas 1030, and power management circuitry (PMC) (shown as PMC 1034) coupled together at least as shown. The components of the illustrated device 1000 may be included in a UE or a RAN node. In some embodiments, the device 1000 may include fewer elements (e.g., a RAN node may not utilize application circuitry 1006, and instead include a processor/controller to process IP data received from an EPC). In some embodiments, the device 1000 may include additional elements such as for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1006 may include one or more application processors. For example, the application circuitry 1006 may include circuitry such as, but not limited to, one or more single-core or multi-core processors. The processors) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1006 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1002 and to generate baseband signals for a transmit signal path of the RF circuitry 1002. The baseband circuitry 1004 may interface with the application circuitry 1006 for generation and processing of the baseband signals and for controlling operations of the RF circuitry 1002. For example, in some embodiments, the baseband circuitry 1004 may include a third generation (3G) baseband processor (3G baseband processor 1008), a fourth generation (4G) baseband processor (4G baseband processor 1010), a fifth generation (5G) baseband processor (5G baseband processor 1012) or other baseband processor(s) 1014 for other existing generations, generations in development or to be developed in the future (e.g., second generation (2G), sixth generation (6G), etc.). The baseband circuitry 1004 (e.g., one or more of baseband processors) may handle various radio control functions that enable communication with one or more radio networks via the RF circuitry 1002. In other embodiments, some or all of the functionality of the illustrated baseband processors may be included in modules stored in the memory 1020 and executed via a Central Processing Unit (CPU 1016). The radio control functions may include, but are not limited to signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include a digital signal processor (DSP), such as one or more audio DSP(s) 1018. The one or more audio DSP(s) 1018 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1006 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1004 is configured to support radio communications of more than one wireless protocol may be referred to as multi-mode baseband circuitry.

The RF circuitry 1002 may enable communication with wireless networks using modulated electromagnetic radiation through a non-solid medium. In various embodiments, the RF circuitry 1002 may include switches, filters, amplifiers, etc. to facilitate the communication with the wireless network. The RF circuitry 1002 may include a receive signal path which may include circuitry to down-convert RF signals received from the FEM circuitry 1032 and provide baseband signals to the baseband circuitry 1004. The RF circuitry 1002 may also include a transmit signal path which may include circuitry to up-convert baseband signals provided by the baseband circuitry 1004 and provide RF output signals to the FEM circuitry 1032 for transmission.

In some embodiments, the receive signal path of the RF circuitry 1002 may include mixer circuitry 1022, amplifier circuitry 1024 and filter circuitry 1026. In some embodiments, the transmit signal path of the RF circuitry 1002 may include filter circuitry 1026 and mixer circuitry 1022. The RF circuitry 1002 may also include synthesizer circuitry 1028 for synthesizing a frequency for use by the mixer circuitry 1022 of the receive signal path and the transmit signal path. In some embodiments, the mixer circuitry 1022 of the receive signal path may be configured to down-convert RF signals received from the FEM circuitry 1032 based on the synthesized frequency provided by synthesizer circuitry 1028. The amplifier circuitry 1024 may be configured to amplify the down-converted signals and the filter circuitry 1026 may be a low-pass filter (LPF) or band-pass Filter (BFF) configured to remove unwanted signals from the down-converted signals to generate output baseband signals Output baseband signals may be provided to the baseband circuitry 1004 for further processing. In some embodiments, the output baseband signals may be zero-frequency baseband signals, although this is not a requirement, in some embodiments, the mixer circuitry 1022 of the receive signal path may comprise passive mixers, although the scope of the embodiments is not limited in this respect.

In some embodiments, the mixer circuitry 1022 of the transmit signal path may be configured to up-convert input baseband signals based on the synthesized frequency provided by the synthesizer circuitry 1028 to generate RF output signals for the FEM circuitry 1032. The baseband signals may be provided by the baseband circuitry 1004 and may be filtered by the filter circuitry 1026.

In some embodiments, the mixer circuitry 1022 of the receive signal path and the mixer circuitry 1022 of the transmit signal path may include two or more mixers and may be arranged for quadrature downconversion and upconversion, respectively. In some embodiments, the mixer circuitry 1022 of the receive signal path and the mixer circuitry 1022 of the transmit signal path may include two or more mixers and may be arranged for image rejection (e.g., Hartley image rejection). In some embodiments, the mixer circuitry 1022 of the receive signal path and the mixer circuitry 1022 may be arranged for direct downconversion and direct upconversion, respectively. In some embodiments, the mixer circuitry 1022 of the receive signal path and the mixer circuitry 1022 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1002 may include analog-to-digital converter (ADC) and digital-to-analog converter (DAC) circuitry and the baseband circuitry 1004 may include a digital baseband interface to communicate with the RF circuitry 1002.

In some dual-mode embodiments, a separate radio IC circuitry may be provided for processing signals for each spectrum, although the scope of the embodiments is not limited in this respect.

In some embodiments, the synthesizer circuitry 1028 may be a fractional-N synthesizer or a fractional N/N+1 synthesizer, although the scope of the embodiments is nor limited in this respect as other types of frequency synthesizers may be suitable. For example, synthesizer circuitry 1028 may be a delta-sigma synthesizer, a frequency multiplier, or a synthesizer comprising a phase-locked loop with a frequency divider.

The synthesizer circuitry 1028 may be configured to synthesize an output frequency for use by the mixer circuitry 1022 of the RF circuitry 1002 based on a frequency input and a divider control input. In some embodiments, the synthesizer circuitry 1028 may be a fractional N/N+1 synthesizer.

In some embodiments, frequency input may be provided by a voltage controlled oscillator (VCO) although that is not a requirement. Divider control input may be provided by either the baseband circuitry 1004 or the application circuitry 1006 (such as an applications processor) depending on the desired output frequency. In some embodiments, a divider control input (e.g., N) may be determined from a look-up table based on a channel indicated by the application circuitry 1006.

Synthesizer circuitry 1028 of the RF circuitry 1002 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1028 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1002 may include an IQ/polar converter.

The FEM circuitry 1032 may include a receive signal path which may include circuitry configured to operate on RF signals received from one or more antennas 1030, amplify the received signals and provide the amplified versions of the received signals to the RF circuitry 1002 for further processing. The FEM circuitry 1032 may also include a transmit signal path which may include circuitry configured to amplify signals for transmission provided by the RF circuitry 1002 for transmission by one or more of the one or more antennas 1030. In various embodiments, the amplification through the transmit or receive signal paths may be done solely in the RF circuitry 1002, solely in the FEM circuitry 1032, or in both the RF circuitry 1002 and the FEM circuitry 1032.

In some embodiments, the FEM circuitry 1032 may include a TX/RX switch to switch between transmit mode and receive mode operation. The FEM circuitry 1032 may include a receive signal path and a transmit signal path. The receive signal path of the FEM circuitry 1032 may include an LNA to amplify received RF signals and provide the amplified received RF signals as an output (e.g., to the RF circuitry 1002). The transmit signal path of the FEM circuitry 1032 may include a power amplifier (PA) to amplify input RF signals (e.g., provided by the RF circuitry 1002) and one or more filters to generate RF signals for subsequent transmission (e.g., by one or more of the one or more antennas 1030).

In some embodiments, the PMC 1034 may manage power provided to the baseband circuitry 1004. In particular, the PMC 1034 may control power-source selection, voltage scaling, battery charging, or DC-to-DC conversion. The PMC 1034 may often be included when the device 1000 is capable of being powered by a battery, for example, when the device 1000 is included in a UE. The PMC 1034 may increase the power conversion efficiency while providing desirable implementation size and heat dissipation characteristics, FIG. 10 shows the PMC 1034 coupled only with the baseband circuitry 1004. However, in other embodiments, the PMC 1034 may be additionally or alternatively coupled with, and perform similar power management operations for, other components such as, but not limited to, the application circuitry 1006, the RF circuitry 1002, or the FEM circuitry 1032.

In some embodiments, the PMC 1034 may control, or otherwise be part of various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and docs not perform operations such as channel quality feedback, handover, etc. The device 1000 goes into a very low power state and it performs paging where again it periodically wakes up to listen to the network and then powers down again. The device 1000 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1006 and processors of the baseband circuitry 1004 may be used to execute elements of one or more instances of a protocol stack. For example, processors of the baseband circuitry 1004, alone or in combination, may be used to execute Layer 3, Layer 2, or Layer 1 functionality, while processors of the application circuitry 1006 may utilize data (e.g., packet data) received from these layers and further execute Layer 4 functionality (e.g., transmission communication protocol (TCP) and user datagram protocol (UDP) layers). As referred to herein. Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein. Layer 1 may comprise a physical (PHY) layer of a UE/RAN node, described in further detail below.

Figure 11:
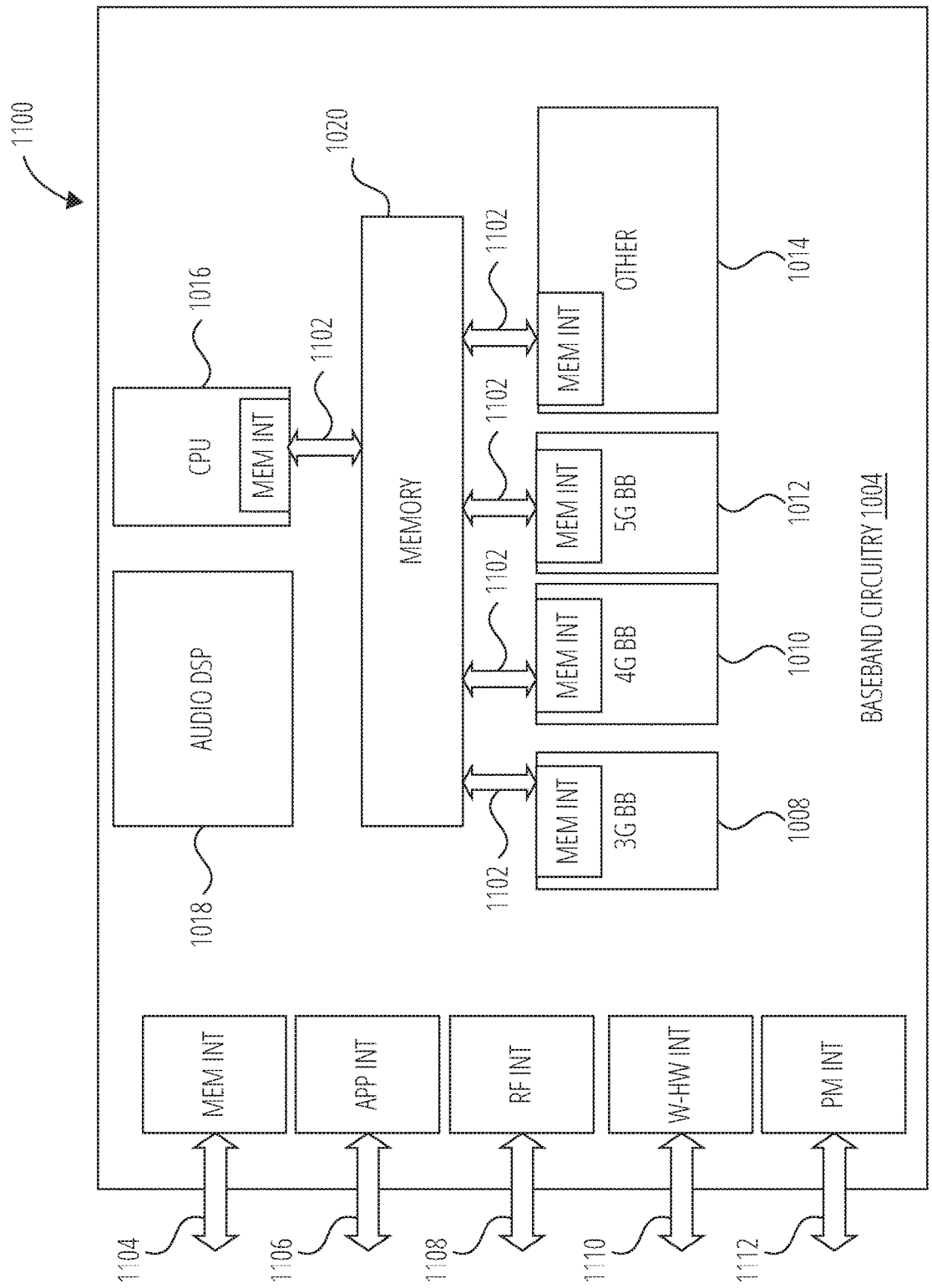
FIG. 11 illustrates example interfaces in accordance with one embodiment.

FIG. 11 illustrates example interfaces 1100 of baseband circuitry in accordance with some embodiments. As discussed above, the baseband circuitry 1004 of FIG. 10 may comprise 3G baseband processor 1008, 4G baseband processor 1010, 5G baseband processor 1012, other baseband processors) 1014. CPU 1016, and a memory 1020 utilized by said processors. As illustrated, each of the processors may include a respective memory interface 1102 to send/receive data to/from the memory 1020.

The baseband circuitry 1004 may further include one or more interfaces to communicatively couple to other circuitries/devices, such as a memory interface 1104 (e.g., an interface to send/receive data to/from memory external to the baseband circuitry 1004), an application circuitry interface 1106 (e.g., an interface to send/receive data to/from the application circuitry 1006 of FIG. 10), an RF circuitry interface 1108 (e.g., an interface to send/receive data to/from RF circuitry 1002 of FIG. 10), a wireless hardware connectivity interface 1110 (e.g., an interface to send/receive data to/from Near Field Communication (NFC) components. Bluetooth® components (e.g., Bluetooth® Low Energy), Wi-Fi® components, and other communication components), and a power management interface 1112 (e.g., an interface to send/receive power or control signals to/from the PMC 1034.

Figure 12:
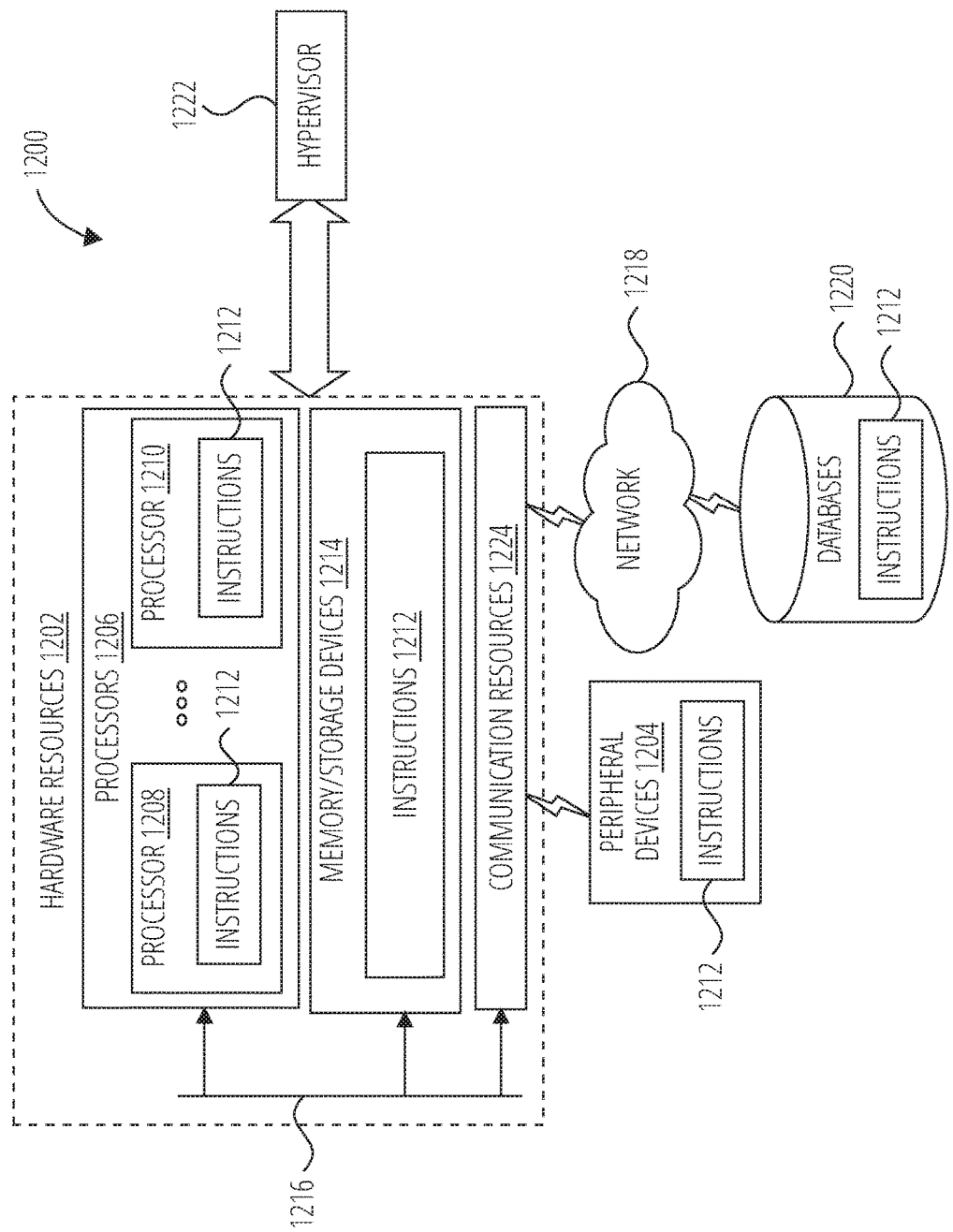
FIG. 12 illustrates components in accordance with one embodiment.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1206 (or processor cores), one or more memory/storage devices 1214, and one or more communication resources 1224, each of which may be communicatively coupled via a bus 1216. For embodiments where node virtualization (e.g., NFV) is utilized, a hypervisor 1222 may be executed to provide an execution environment for one or more network slices/sub-slices to utilize the hardware resources 1202.

The processors 1206 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1208 and a processor 1210.

The memory/storage devices 1214 may include main memory, disk storage, or any suitable combination thereof. The memory/storage devices 1214 may include, but are not limited to any type of volatile or non-volatile memory such as dynamic random access memory (DRAM), static random-access memory (SRAM), erasable programmable read-only memory (EPROM), electrically erasable programmable read-only memory (EEPROM). Flash memory, solid-state storage, etc.

The communication resources 1224 may include interconnection or network interface components or other suitable devices to communicate with one or more peripheral devices 1204 or one or more databases 1220 via a network 1218. For example, the communication resources 1224 may include wired communication components (e.g., for coupling via a Universal Serial Bus (USB)), cellular communication components, NFC components. Bluetooth® components (e.g., Bluetooth® Low-Energy), Wi-Fi® components, and other communication components.

Instructions 1212 may comprise software, a program, an application, an applet, an app, or other executable code for causing at least any of the processors 1206 to perform any one or more of the methodologies discussed herein. The instructions 1212 may reside, completely or partially, within at least one of the processors 1206 (e.g., within the processor's cache memory), the memory/storage devices 1214, or any suitable combination thereof. Furthermore, any portion of the instructions 1212 may be transferred to the hardware resources 1202 from any combination of the peripheral devices 1204 or the databases 1220. Accordingly, the memory of the processors 1206, the memory/storage devices 1214, the peripheral devices 1204, and the databases 1220 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE base station, network element, etc. as described above in connection with one or more of the preceding figures may be configured to operate in accordance with one or more of the examples set forth below in the example section.

Example Section

The following examples pertain to further embodiments.

Example 1 is a method for a user equipment (UE) that supports dynamic spectrum sharing (DBS) with uplink (UL)-shift the method comprising: receiving a first message from a network node, the first message comprising a cell barred field; decoding the first message and determining status of the cell barred field; receiving a second message from the network node comprising a second field related to support of UL-shift; decoding the second message and determining status of the second field; accessing a cell when the cell barred field is set to barred and the second field indicates that UEs which support DSS with UL-shift are allowed to access the cell.

Example 2 is the method of Example L wherein the second field is a frequencyShift7p5khz field, wherein the cell is truly barred when the frequencyShift7p5khz field is set to false and the cell barred field is set to barred, and wherein the UEs which support DSS with UL-shift are allowed to access the cell when the frequencyShift7p5khz field is set to true and the cell barred field is set to barred.

Example 3 is the method of Example 1, wherein the second field is an exemption field which explicitly expresses whether the UEs which support DSS with UL-shift are allowed to camp or not when the cell barred field is set to barred.

Example 4 is the method of Example 1, further comprising checking that the UE supports UL-shift only for an initial bandwidth pan (BWP) against a particular sub-carrier spacing (SCS) the initial BWP is configured with, and wherein the UE accesses the cell when the UE supports UL-shift for the initial BWP.

Example 5 is the method of Example 1, further comprising checking that the UE supports UL shift for all the BWPs against a SCS broadcasted information provides, and wherein the UE accesses the cell only when the UE supports UL-shift for all BWPs.

Example 6 is the method of Example 1, wherein the first message is a master information block (MIB) and the second message is a system information block 1 (SIB1).

Example 7 is the method of Example 1, wherein the second field is provided in a FrequencyInfoUL information element.

Example 8 is the method of Example 1, further comprising reporting to the network node UL-shifting capability for each band that the supports.

Example 9 is a user equipment (UE) that supports dynamic spectrum sharing (DSS) with uplink (UL)-shift the UE comprising: a baseband processing unit; and a memory storing instructions that, when executed fey the baseband processing unit, configure the UE to: receive a first message front a network node, the first message comprising a cell barred field; decode the first message and determining status of the cell barred field; receive a second message from the network node comprising a second field related to support, of UL-shift; decode the second message and determining status of the second field; access a cell when the cell barred field is set to barred and the second field indicates that UEs which support DSS with UL-shift are allowed to access the cell.

Example 10 is the computing UE of Example 9, wherein the second field is a frequencyShift7p5khz field, wherein the cell is truly barred when the frequencyShift7p5khz field is set to false and the cell barred field is set to barred, and wherein the UEs which support DSS with UL-shift are allowed to access the cell when the frequencyShift7p5khz field is set to true and the cell barred field is set to barred.

Example 11 is the computing UE of Example 9, wherein the second field is an exemption field which explicitly expresses whether the UEs which support DSS with UL-shift are allowed to camp or not when the cell barred field is set to barred.

Example 12 is the computing UE of Example 9, wherein the instructions further configure the apparatus to check that the UE supports UL-shift only for an initial bandwidth part (BWP) against a particular sub-carrier spacing (SCS) the initial BWP is configured with, and wherein the UE accesses the cell when the UE supports UL-shift for the initial BWP.

Example 13 is the computing UE of Example 9, wherein the instructions further configure the apparatus to check that the UE supports UL shift for all the BWPs against a SCS broadcasted information provides, and wherein the UE accesses the cell only when the UE supports UL-shift for all BWPs.

Example 14 is the computing UE of Example 9, wherein the first message is a master information block (MIB) and the second message is a system information block 1 (SIB1).

Example 15 is the computing UE of Example 9, wherein the second field is provided in a FrequencyInfoUL information element.

Example 16 is the computing UE of Example 9, wherein the instructions further configure the apparatus to report to the network node UL-shifting capability for each baud that the UE supports.

Example 17 is a method for a source network node, the method comprising: connecting with a UE; determining that the source network node is to handover the UE to a target network node using dynamic spectrum sharing (DSS) with uplink (UL)-shift; receiving a report indicating whether the UE supports DSS with UL-shifting; and performing a handover of the UE to the target network node if the UE supports DSS with UL-shifting.

Example 18 is the method of Example 17, further comprising checking that the UE supports UL shift only for an initial bandwidth part (BWP) against a particular sub-carrier spacing (SCS) the initial BWP is configured for the target network node.

Example 19 is the method of Example 17, further comprising checking that the UE supports UL shift for all the BWPs against a SCS for the network node.

Example 22 is the method of Example 17, wherein the report indicates DSS with UL-shifting capability for each band that the UE supports.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 23 may include an apparatus comprising logic, modules, or circuitry to perform one or more elements of a method described in or related to any of the above Examples, or any other method or process described herein.

Example 24 may include a method, technique, or process as described in or related to any of the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, packet, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDU, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communicating in a wireless network as shown and described herein.

Example 34 may include a system for providing wireless communication as show n and described herein.

Example 35 may include a device for providing wireless communication as shown and described herein.

Any of the above described examples may be combined with any other example tor combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers tor other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) that supports dynamic spectrum sharing (DSS) with uplink (UL)-shift, the method comprising:
   receiving a first message from a network node, the first message comprising a cell barred field;
   decoding the first message and determining status of the cell barred field;
   receiving a second message from the network node comprising a second field related to barring UEs that support DSS with uplink-shift, and a third field related to support of UL-shift;
   decoding the second message and determining status of the second field and the third field, wherein the second field is an exemption field which explicitly expresses whether UEs which support DSS with UL-shift are allowed to camp or not when the cell barred field is set to barred, and wherein the third field is a frequnecyShift7p5khz field; and
   accessing a cell when the cell barred field is set to barred and the second field indicates that the UEs which support DSS with UL-shift are allowed to access the cell, and the third field is set to true.

2. The method of claim 1, further comprising checking that the UE supports UL-shift only for an initial bandwidth part (BWP) against a particular sub-carrier spacing (SCS) the initial BWP is configured with, and wherein the UE accesses the cell when the UE supports UL-shift for the initial BWP.

3. The method of claim 1, further comprising checking that the UE supports UL shift for all the BWPs against a SCS broadcasted information provides, and wherein the UE accesses the cell only when the UE supports UL-shift for all BWPs.

4. The method of claim 1, wherein the first message is a master information block (MIB) and the second message is a system information block 1 (SIB1).

5. The method of claim 1, wherein the second field is provided in a FrequencyInfoUL information element.

6. The method of claim 1, further comprising reporting to the network node UL-shifting capability for each band that the UE supports.

7. A user equipment (UE) that supports dynamic spectrum sharing (DSS) with uplink (UL)-shift, the UE comprising:
   a baseband processing unit; and
   a memory storing instructions that, when executed by the baseband processing unit, configure the UE to:
   receive a first message from a network node, the first message comprising a cell barred field;
   decode the first message and determining status of the cell barred field;
   receive a second message from the network node comprising a second field related to barring UEs that support DSS with uplink-shift, and a third field related to support of UL-shift;
   decode the second message and determining status of the second field and the third field, wherein the second field is an exemption field which explicitly expresses whether UEs which support DSS with UL-shift are allowed to camp or not when the cell barred field is set to barred, and wherein the third field is a frequencyShift7p5 hz field;
   access a cell when the cell barred field is set to barred and the second field indicates that the UEs which support DSS with UL-shift are allowed to access the cell, and the third field is set to true.

8. The UE of claim 7, wherein the instructions further configure the baseband processing unit to check that the UE supports UL-shift only for an initial bandwidth part (BWP) against a particular sub-carrier spacing (SCS) the initial BWP is configured with, and wherein the UE accesses the cell when the UE supports UL-shift for the initial BWP.

9. The UE of claim 7, wherein the instructions further configure the baseband processing unit to check that the UE supports UL shift for all the BWPs against a SCS broadcasted information provides, and wherein the UE accesses the cell only when the UE supports UL-shift for all BWPs.

10. The UE of claim 7, wherein the first message is a master information block (MIB) and the second message is a system information block 1 (SIB1).

11. The UE of claim 7, wherein the second field is provided in a FrequencyInfoUL information element.

12. The UE of claim 7, wherein the instructions further configure the baseband processing unit to report to the network node UL-shifting capability for each band that the UE supports.

13. A non-transitory computer-readable storage medium of a user equipment (UE) that supports dynamic spectrum sharing (DSS) with uplink (UL)-shift, the computer-readable storage medium having computer-readable instructions stored thereon, the computer-readable instructions configured to instruct one or more processors to:
   receive a first message from a network node, the first message comprising a cell barred field;
   decode the first message and determining status of the cell barred field;
   receive a second message from the network node comprising a second field related to barring UEs that support DSS with uplink-shift, and a third field related to support of UL-shift;
   decode the second message and determining status of the second field and the third field, wherein the second field is an exemption field which explicitly expresses whether UEs which support DSS with UL-shift are allowed to camp or not when the cell barred field is set to barred, and wherein the third field is a frequencyShift7p5khz field;
   access a cell when the cell barred field is set to barred and the second field indicates that the UEs which support DSS with UL-shift are allowed to access the cell, and the third field is set to true.

14. The non-transitory computer-readable storage medium of claim 13, wherein the computer-readable instructions are configured to instruct the one or more processors to check that the UE supports UL-shift only for an initial bandwidth part (BWP) against a particular sub-carrier spacing (SCS) the initial BWP is configured with, and wherein the UE accesses the cell when the UE supports UL-shift for the initial BWP.

* * * * *